(12) United States Patent
Bankhead et al.

(10) Patent No.: US 7,518,733 B2
(45) Date of Patent: Apr. 14, 2009

(54) SURFACE PROFILING APPARATUS

(75) Inventors: Andrew Douglas Bankhead, Leicester (GB); Ian Lee-Bennett, Leicester (GB); Ivor McDonnell, Leicester (GB)

(73) Assignee: Taylor Hobson Limited, Leicester (GB)

( * ) Notice: Subject to any disclaimer, the term of this patent is extended or adjusted under 35 U.S.C. 154(b) by 308 days.

(21) Appl. No.: 10/536,821

(22) PCT Filed: Nov. 21, 2003

(86) PCT No.: PCT/GB03/05080

§ 371 (c)(1),
(2), (4) Date: May 27, 2005

(87) PCT Pub. No.: WO2004/048886

PCT Pub. Date: Jun. 10, 2004

(65) Prior Publication Data

US 2006/0018514 A1    Jan. 26, 2006

(30) Foreign Application Priority Data

Nov. 27, 2002 (GB) .................................. 0227673.1

(51) Int. Cl.
*G01B 11/02* (2006.01)
(52) U.S. Cl. ..................................... 356/511
(58) Field of Classification Search ................. 356/511, 356/512, 516, 489
See application file for complete search history.

(56) References Cited

U.S. PATENT DOCUMENTS 4,040,747 A * 8/1977 Webster ....................... 356/418
4,340,306 A 7/1982 Balasubramanian
4,387,994 A 6/1983 Balasubramanian (Continued)

FOREIGN PATENT DOCUMENTS

| WO | WO-93/16631 | 9/1993 |
|----|-------------|--------|
| WO | WO-94/18523 | 8/1994 |
| WO | WO-01/42735 A1 | 6/2001 |
| WO | WO 03/078925 | 9/2003 |
| WO | WO-2004/048886 A1 | 6/2004 |

OTHER PUBLICATIONS

U.S. Appl. No. 10/507,837, filed May 23, 2005, Bankhead et al.
Friedheim Becker et al., "Automatic evaluation of interferograms," *SPIE*, vol. 359, Applications of Digital Image Processing IV (1982), pp. 386-393.

(Continued)

*Primary Examiner*—Michael A Lyons
*Assistant Examiner*—Jonathan M Hansen
(74) *Attorney, Agent, or Firm*—RatnerPrestia

(57) ABSTRACT

Light is directed along a sample path towards the sample surface and along a reference path towards a reference surface such that light reflected by the sample surface and light reflected by the reference surface interfere. Relative movement is effected between the sample surface and the reference surface along a measurement path and the light intensity resulting from interference between light reflected from the reference surface and regions of the sample surface is sensed at intervals along the measurement path to provide a number of sets of light intensity data values with each light intensity data value representing the sensed light intensity associated with a corresponding one of said regions. The sets of light intensity data are processed to determine a position along the measurement path at which a predetermined feature occurs in the light intensity data for each sensed region and to enhance image data representing the intensity data to facilitate the detection by a user of the interference fringes.

21 Claims, 20 Drawing Sheets

U.S. PATENT DOCUMENTS

| | | | |
|---|---|---|---|
| 4,818,110 A | 4/1989 | Davidson | |
| 4,845,356 A | 7/1989 | Baker | |
| 5,112,129 A | 5/1992 | Davidson et al. | |
| 5,321,501 A | 6/1994 | Swanson et al. | |
| 5,355,221 A | 10/1994 | Cohen et al. | |
| 5,471,303 A * | 11/1995 | Ai et al. | 356/497 |
| 5,661,557 A * | 8/1997 | Da Silva et al. | 356/301 |
| 5,706,085 A | 1/1998 | Blossey et al. | |
| 5,907,404 A | 5/1999 | Marron et al. | |
| 5,953,124 A * | 9/1999 | Deck | 356/497 |
| 6,028,670 A | 2/2000 | Deck | |
| 6,031,928 A | 2/2000 | Scott | |
| 6,084,671 A | 7/2000 | Holcomb | |
| 6,191,862 B1 | 2/2001 | Swanson et al. | |
| 6,215,555 B1 | 4/2001 | Chivers | |
| 6,345,107 B1 | 2/2002 | Scott | |
| 6,545,761 B1 | 4/2003 | Aziz et al. | |
| 6,552,806 B1 | 4/2003 | Swinford et al. | |
| 6,956,657 B2 | 10/2005 | Golini et al. | |
| 7,171,037 B2 * | 1/2007 | Mahon et al. | 382/145 |
| 2001/0050773 A1 | 12/2001 | De Groot et al. | |
| 2003/0011784 A1 | 1/2003 | De Groot et al. | |
| 2003/0117632 A1 | 6/2003 | Golini et al. | |
| 2004/0184653 A1 * | 9/2004 | Baer et al. | 382/145 |

OTHER PUBLICATIONS

Lawrence Mertz, "Real-time fringe-pattern analysis," *Applied Optics*, vol. 22, No. 10, May 15, 1983, pp. 1535-1539.

Katherine Creath, "Step height measurement using two-wavelength phase-shifting interferometry," *Applied Optics*, vol. 26, No. 14, Jul. 15, 1987, pp. 2810-2815.

Peter de Groot et al., "Three-dimensional imaging by sub-Nyquist sampling of white-light interferograms," *Optic Letters*, vol. 18, No. 17, Sep. 1, 1993, pp. 1462-1464.

Bharat Bhushan et al., "Measurement of surface topography of magnetic tapes by Mirau interferometry," *Applied Optics*, vol. 24, No. 10, May 15, 1985; pp. 1489-1497.

Paul F. Forman et al., "The Zygo interferometer system," *SPIE*, vol. 192, Interferometry (1979), pp. 41-48.

Kieran G. Larkin, "Topics in Multi-dimensional Signal Demodulation," A Thesis Submitted to the Faculty of Science in the University of Sydney, Dec. 2000.

Byron S. Lee et al., "Profilometry with a coherence scanning microscope," *Applied Optics*, vol. 29, No. 26, Sep. 10, 1990, pp. 3784-3788.

* cited by examiner

FIG. 20
a 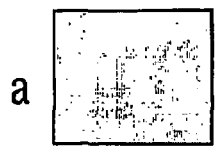
b 
c 
d 
e 
f 
g 
FIG. 21
a 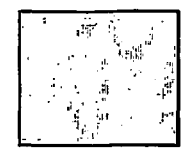
b 
c 
d 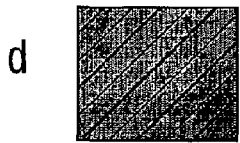
e 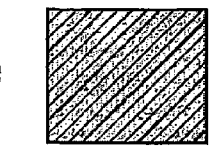
f 
g 

SURFACE PROFILING APPARATUS

This application is the U.S. national phase application of PCT International Application No. PCT/GB2003/005080, filed Nov. 21, 2003, and claims priority of British Patent Application No. 0227673.1, filed Nov. 27, 2002.

This invention relates to a surface profiling apparatus, in particular surface profiling apparatus for determining surface profile data using interferometric techniques.

As discussed in a paper entitled "Profilometry with a Coherence Scanning Microscope" by Byron S. Lee and Timothy C Strand published in Applied Optics Volume 29, No. 26 10 Sep. 1990 at pages 3784 to 3788, as manufacturing tolerances have reduced, demands have increased on optical metrology techniques for improved lateral and vertical resolution. Conventional monochromatic interferometric surface profiling apparatus offers good vertical resolution in the nanometer to Angstrom range but phase ambiguity limits the measurement range to phase shifts of less than $2\pi$. Various techniques have been proposed to extend this measurement range including, for example, phase unwrapping, heterodyne interferometry and multi-wavelength interferometry. However, phase unwrapping generally requires a smooth continuous measurement surface if phase ambiguity errors are not to arise. Heterodyne interferometry involves mixing beams at two separate frequencies and uses the resultant beat frequency for interferometry measurements. Heterodyne interferometry has an unambiguous range based on the wavelength of the beat frequency and this range is therefore limited by the limit on how close the two frequencies used can be. Multi-wavelength interferometry produces at least two different interferometric profiles using different wavelengths and again the unambiguous range is determined by the wavelength of the difference in frequency between the at least two wavelengths used.

As discussed in the paper by Lee and Strand, these problems can be addressed by the use of coherence scanning or broadband scanning interferometry which can provide practical measurement ranges easily exceeding hundreds of micrometers.

Coherence scanning or broadband scanning interferometry uses a standard interferometer such as a Michelson interferometer with a broadband spatially incoherent light source such as a quartz halogen lamp. Generally, but not necessarily, the broadband source will be a white light source. One of the sample surface whose profile is to be determined and the reference mirror of the interferometer is moved relative to the other along a scan path to change the relative path length and a two dimensional image sensor such as a CCD camera is used to sense the resulting interference pattern which changes as the sample surface and reference mirror are moved relative to one another.

Each sensing element or pixel of the image sensor senses the portion of the interference pattern for a corresponding region or surface pixel of the sample surface and, as the sample surface and the reference mirror are moved relative to one another, the amount or intensity of light received by the sensing element will vary in accordance with the change in the interference fringes. The intensity of light received from a region of the sample surface will increase or decrease in amplitude in dependence upon the path length difference between the light paths from the reference mirror and the sensing surface and will have a coherence peak or extremum (maximum or minimum amplitude) at the position of zero path difference. Where different regions of the surface have different relative heights, then those different regions will have coherence peaks at different positions along the scan path. Accordingly, the relative positions of the coherence peaks can be used to provide surface profile data, that is data representing the relative height of the different regions of the sample surface.

It is important to ensure that the coherence peaks for each different surface region fall on the scan path. Although this could be ensured by having a relatively long scan path this would, for most surfaces, result in acquisition of an unnecessarily large number of frames of data which would then have to be stored and processed. It is therefore desirable for the coherence scanning or broadband scanning surface profiling apparatus to be set up to use the minimum scan path required to acquire data to determine the coherence peaks for each different region of the surface being measured.

In one aspect, the present invention provides a broadband or coherence scanning interferometer having a user interface that facilitates determination of an appropriate scan path range or length.

In one aspect, the present invention provides a broadband or coherence scanning interferometer that includes image enhancing means for enhancing acquired image data to assist a user in locating an interference fringe region.

In one aspect, the present invention provides a broadband or coherence scanning interferometer having gradient enhancing means for enhancing gradient in image data for display to a user or operator to make interference fringes more easily visible to a user.

In one aspect, the present invention provides a broadband or coherence scanning interferometer having intensity difference data determining means for determining intensity difference data representing an intensity difference between a current image and a reference image and modifying means for modifying image data for display to a user or operator in accordance with the intensity difference data to make interference fringes more easily visible to a user.

In one aspect, the present invention provides a broadband or coherence scanning interferometer having gradient data determining means for determining gradient data from an image, intensity difference data determining means for determining intensity difference data representing an intensity difference between a current image and a reference image and modifying means for modifying image data for display to a user or operator in accordance with the gradient data and intensity difference data to make interference fringes more easily visible to a user.

In one aspect, the present invention provides a broadband or coherence scanning interferometer having light source adjusting means for enabling a user to focus a broadband or coherence scanning interferometer apparatus more easily.

In one aspect, the present invention provides a broadband or coherence scanning interferometer having filter means for restricting the wavelength of a broadband light source to increase the scanning path range over which interference fringes can be detected so as to facilitate focussing by a user of the broadband or coherence scanning interferometer on an interference fringe region.

In one aspect, the present invention provides a broadband or coherence scanning interferometer having display means arranged to cause display pixels representing certain light intensity values to be easily visually distinguished, for example by being displayed in a different colour from the rest or a majority of the rest of the intensity values to assist a user in setting up the broadband or coherence scanning interferometer.

Embodiments of the present invention will now be described, by way of example, with reference to the accompanying drawings, in which.

Figure 12A:
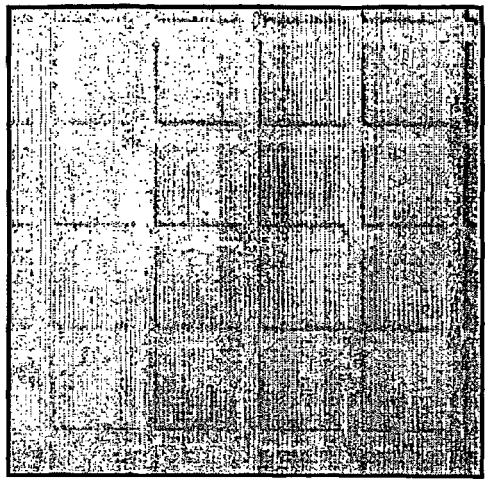
Figure 13B:
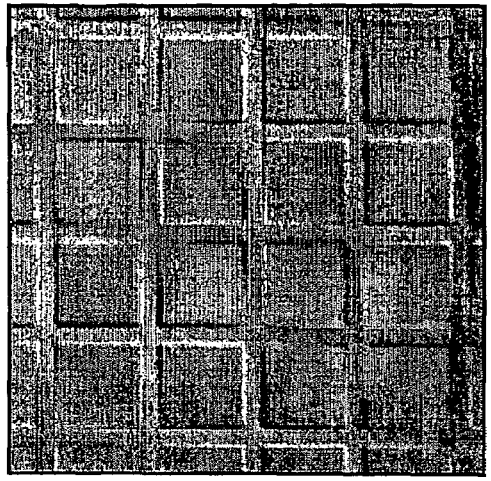
Figure 13D:
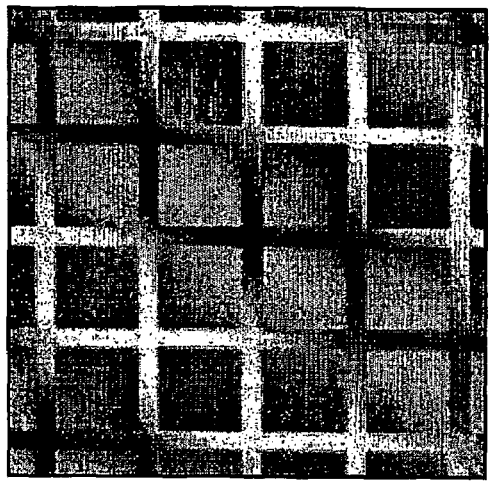
Figure 13A:
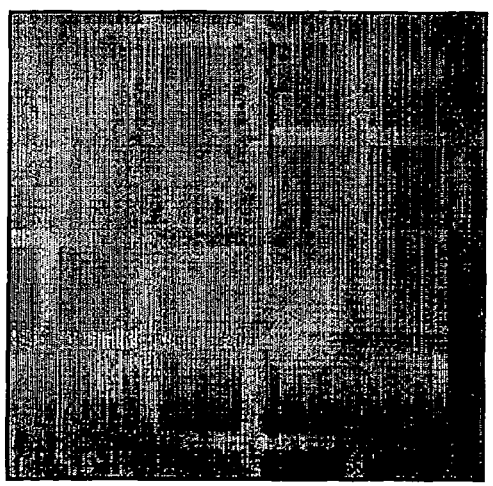
Figure 13C:
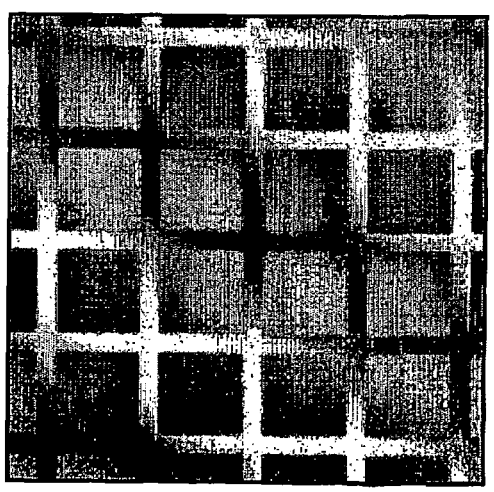
Figure 14:
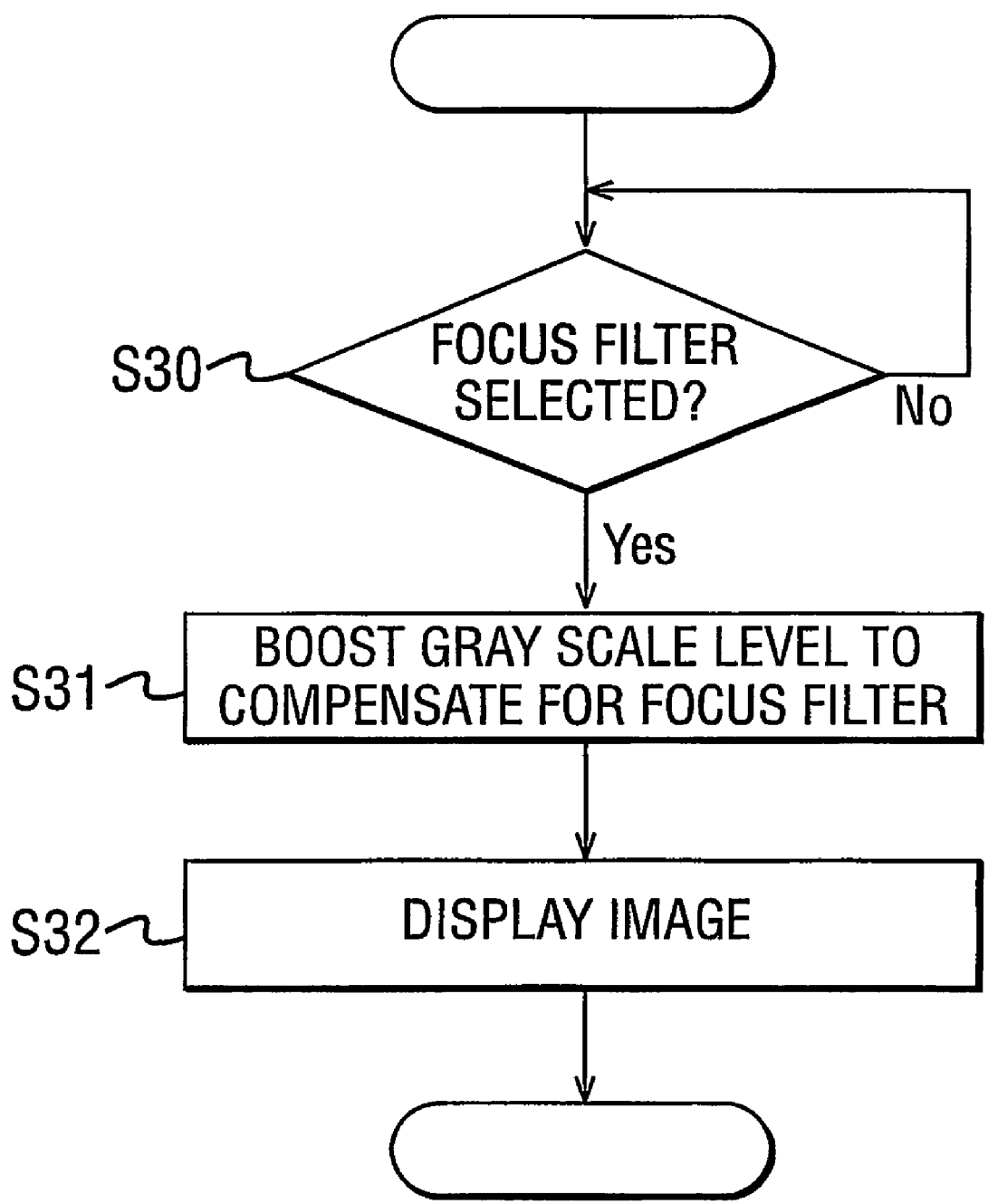
Figure 15:
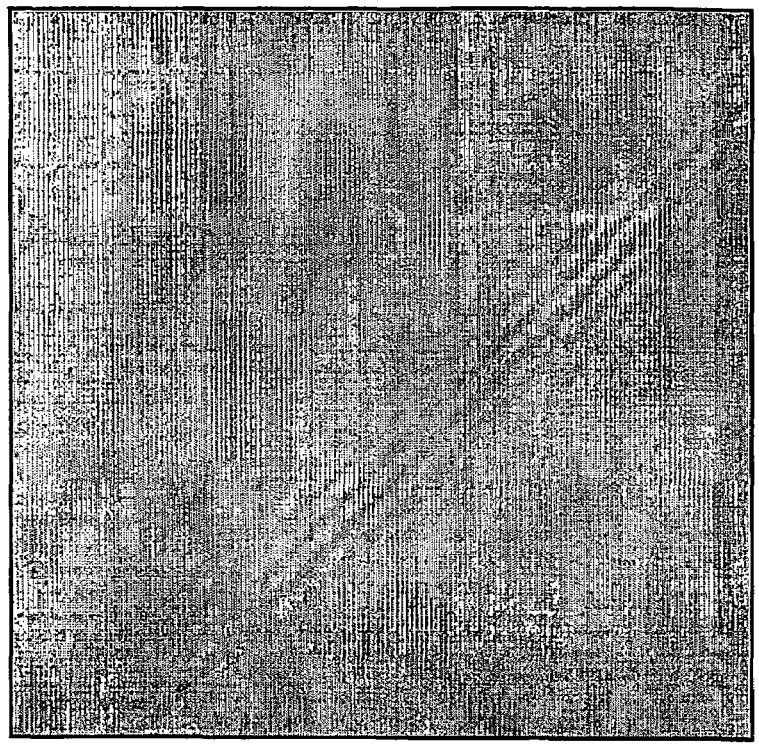
Figure 16:
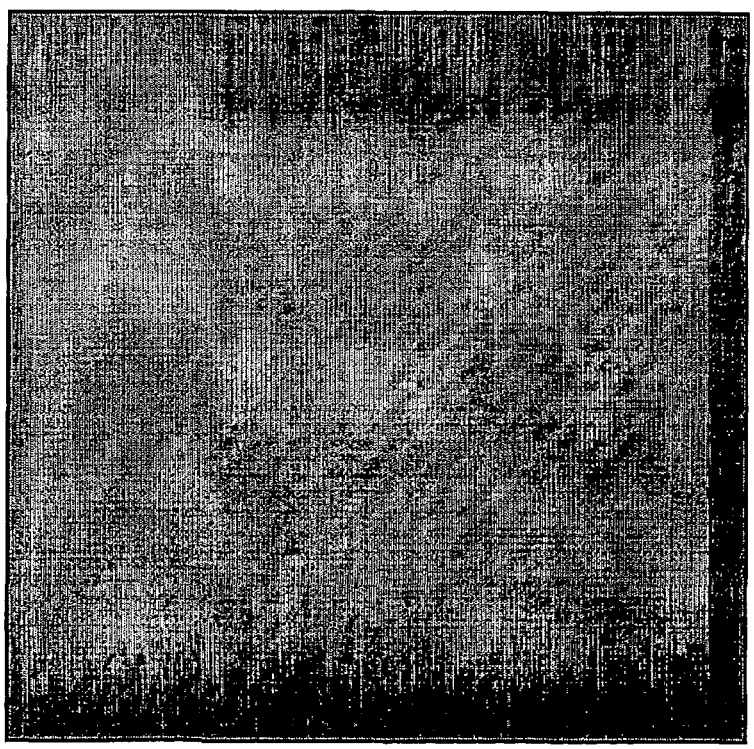
Figure 17:
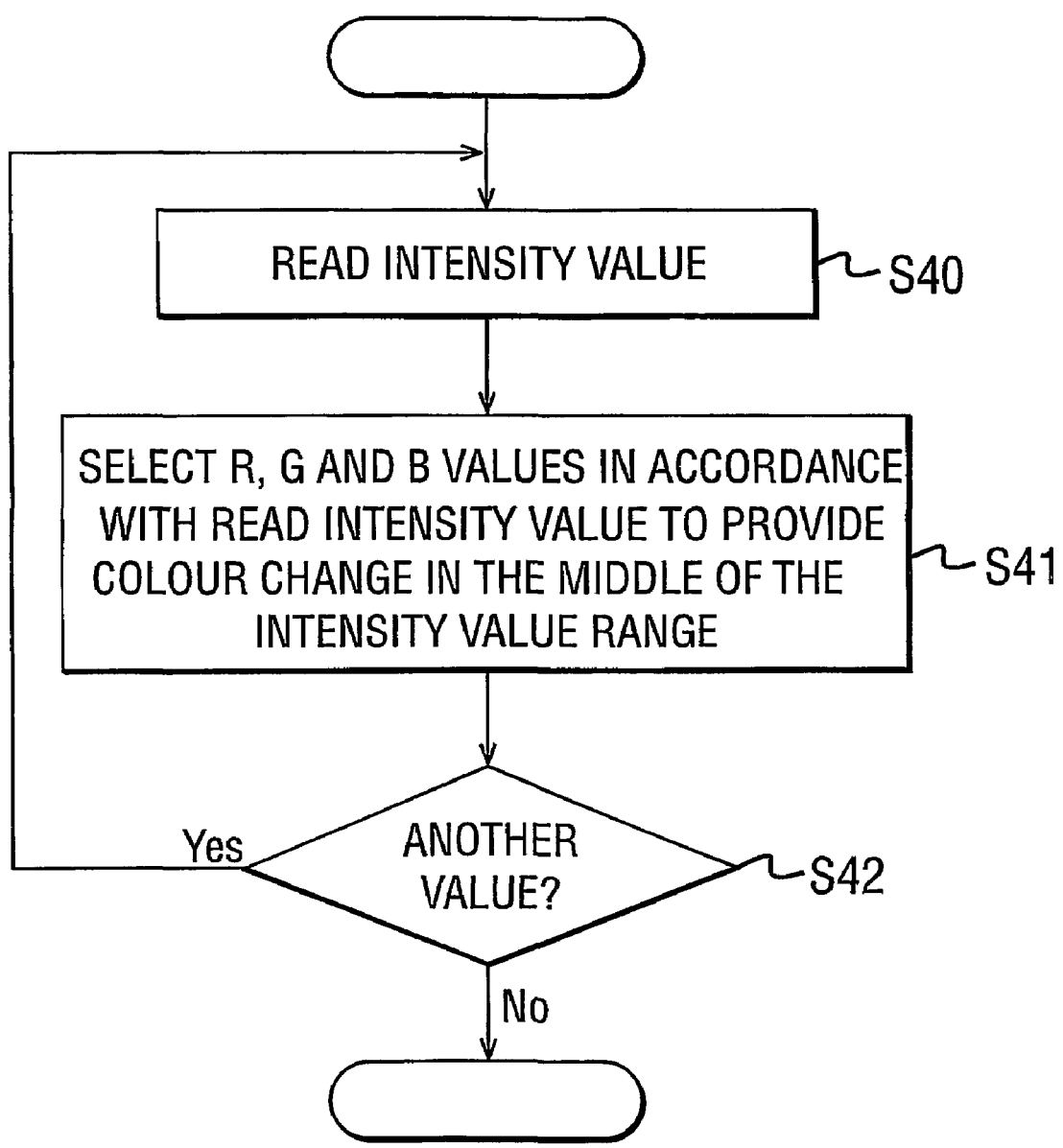
Figure 18:
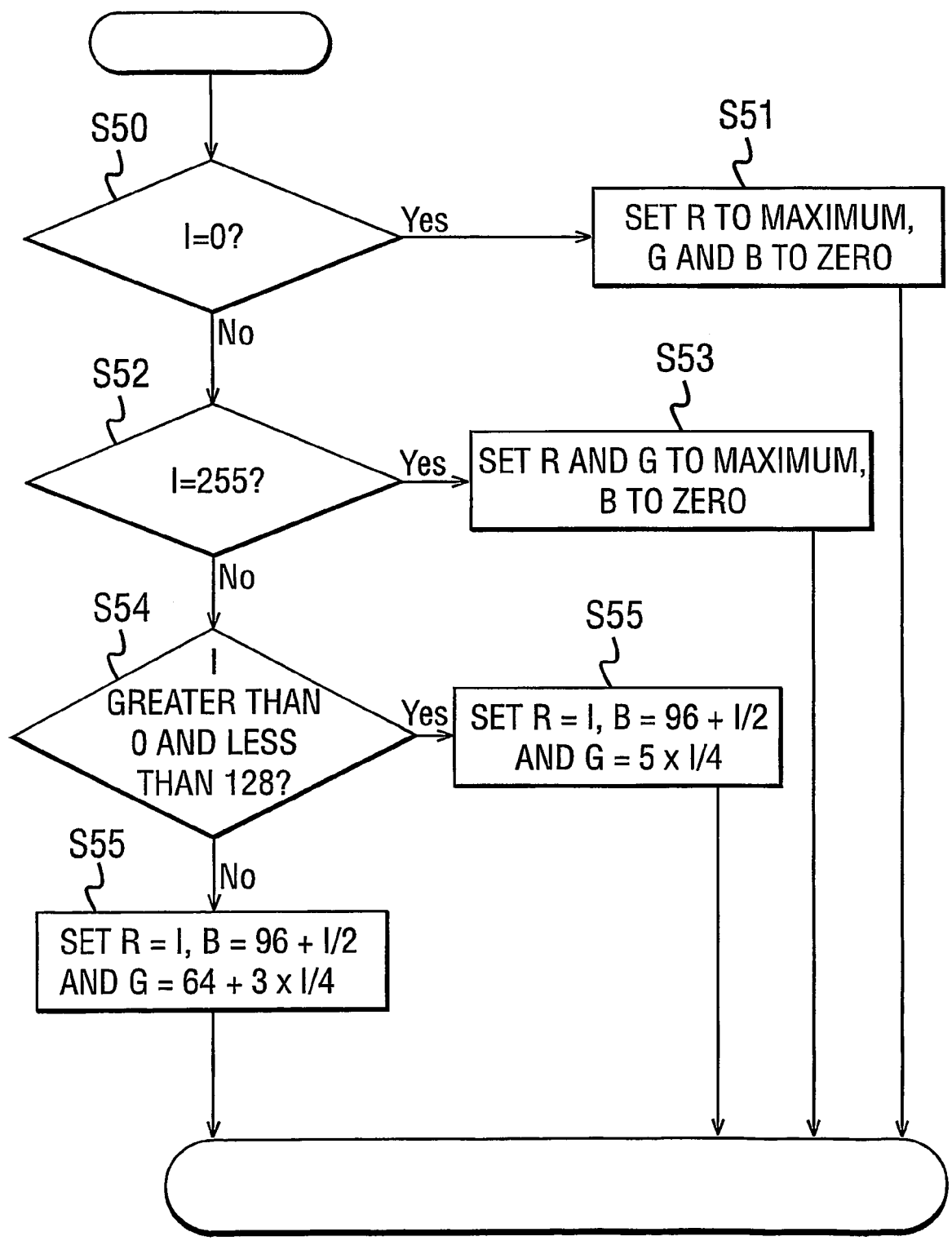
Figure 19:
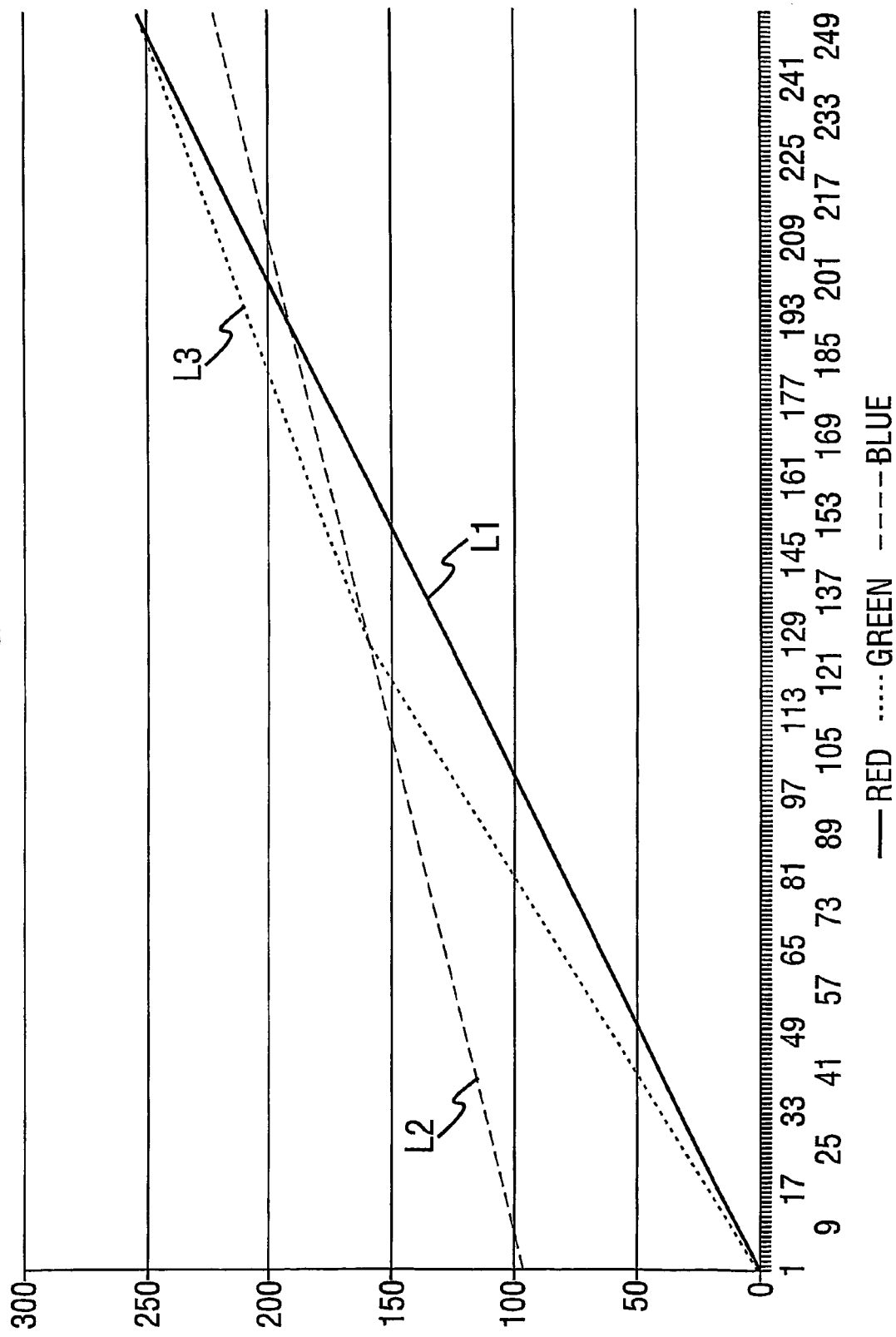
Figure 22:

FIGS. 12a, b, c and d show grey scale representations of an image of a non-fringe region obtained using, respectively, no enhancement, gradient enhancement, contrast enhancement, and both contrast and gradient enhancement;

FIGS. 13a, b, c and d show grey scale representations of an image of an interference fringe region obtained using, respectively, no enhancement, gradient enhancement, contrast enhancement and both gradient and contrast enhancement;

FIG. 14 shows a flow chart illustrating steps carried out by the control apparatus when a focus filter option is selected;

FIGS. 15 and 16 show grey scale representations of images acquired using a neutral density filter and a focus filter, respectively;

FIG. 17 shows a flow chart illustrating steps carried out by the control apparatus to provide a colour adjusted image to facilitate determination by a user of an appropriate light intensity level;

FIG. 18 shows a flow chart illustrating in greater detail a step of selecting R, G and B values of FIG. 17;

FIG. 19 shows a graph for illustrating the effect of the step of selecting R, G and B values shown in FIG. 18;

FIGS. 20a to 20g and FIGS. 21a to 21g show representations for illustrating the appearance of a display pixel of a displayed image as the corresponding light intensity value increases from a to g with FIG. 21 showing the effect of selecting R, G and B manner shown in FIG. 18; and FIG. 22 shows a grey scale representation of an image having an interference fringe region where some of the light intensity values have reached saturation.

Referring now the drawings, the basic principles of surface profile or topography determination using broadband scanning or coherent scanning interferometry techniques will first be described with reference to FIGS. 1 and 2.

Figure 1:
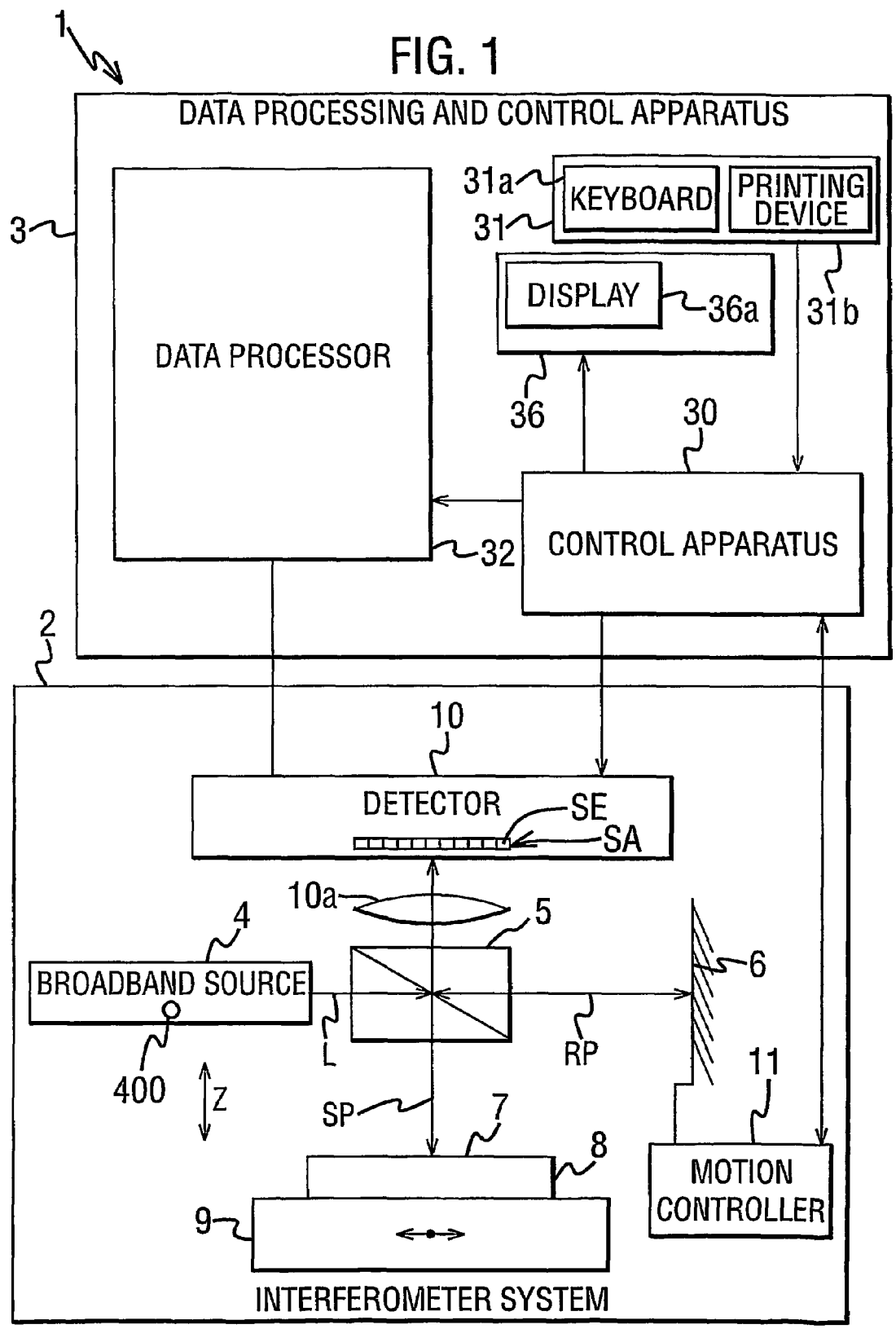
FIG. 1 shows a schematic block diagram of a surface profiling apparatus using a coherence scanning or broadband scanning interferometer.
Figure 2:
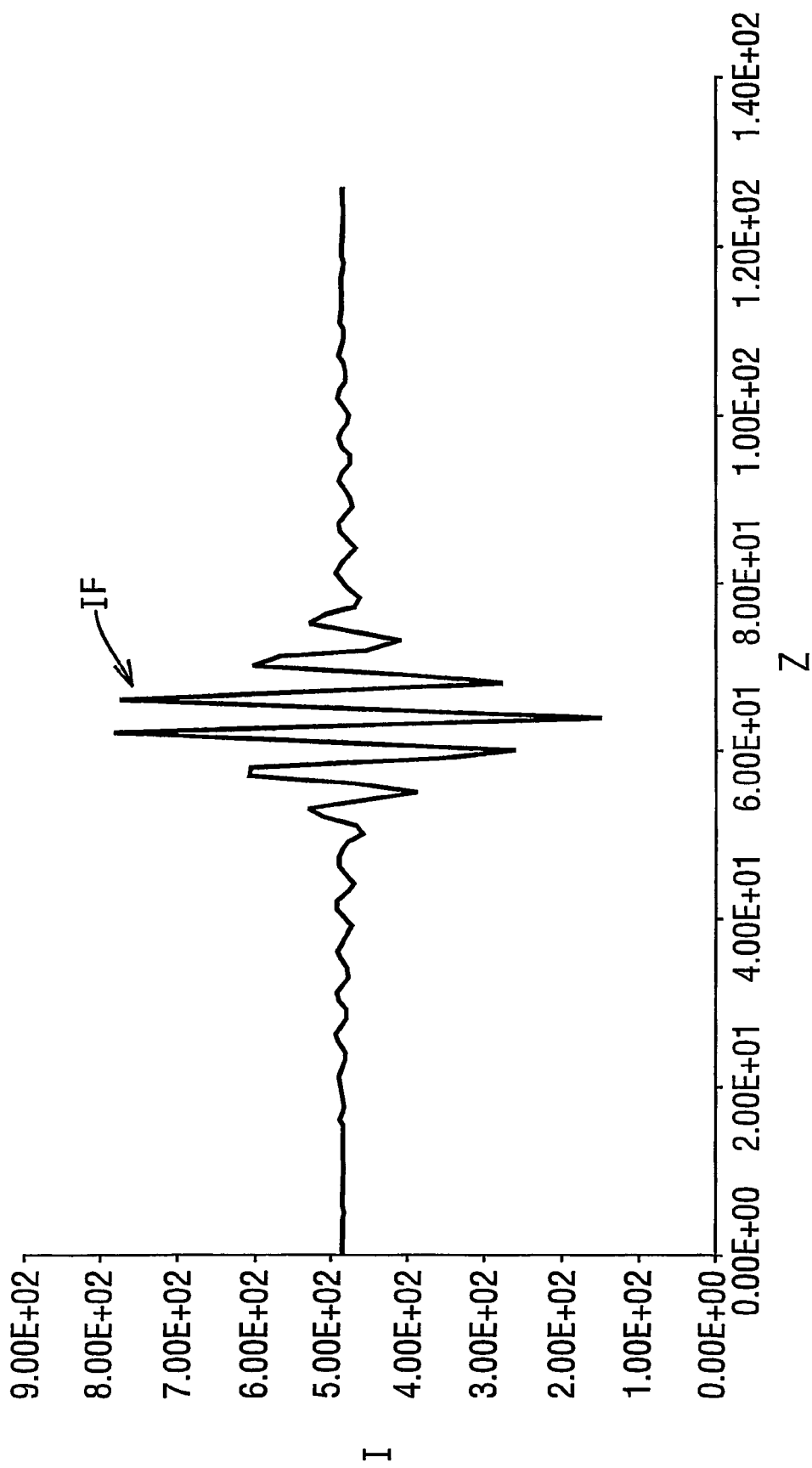
FIG. 2 shows a graph of intensity against position Z to illustrate the interference fringes for a sample surface region around an interference fringe region or coherence peak.

FIG. 1 shows a simplified schematic block diagram of a surface profiling apparatus 1 which has a broadband or coherence scanning interferometer system 2 and data processing and control apparatus 3.

The broadband scanning interferometer system 2 is based on a conventional interferometer but, as discussed in the introduction, instead of having a monochromatic spatially coherent light source, the broadband scanning interferometer system 2 has a broadband source 4 which may be, for example, a white light source such as a quartz halogen lamp coupled to a regulated DC power supply having a light intensity output user control 400 provided in the form of a user-rotatable knob.

The broadband source 4 provides broadband light L which is split by a beam splitter (illustrated in FIG. 1 as a single beam splitting prism) 5 into a first light beam which is directed along a reference path RP towards a reference mirror 6 and a second light beam which is directed along a sample path SP towards a surface 7 of a sample 8 mounted on a sample support stage 9. Light reflected from the reference mirror 6 returns along the reference path RP to the beam splitter 5 where it interferes with light reflected from the sample surface 7 back along the sample path SP. A focussing element 10a is provided to focus an image of the region of interference onto a detector 10.

Typically, the interferometer has, for example, a Mirau, Michelson or Linnik configuration.

In this embodiment, the detector 10 has, as shown very diagrammatically in FIG. 1, a 2D (two-dimensional) array SA of image sensing elements SE. The array images an area of the sample surface 7 falling within the field of view of the detector 10. Each individual sensing element of the 2D sensing array of the detector 10 detects the portion of the interference pattern falling within the acceptance cone of that element and resulting from a corresponding surface region or pixel of the area of the sample surface 7 so that effectively the imaged area of the surface can be considered as a 2D array of surface regions or pixels. In this example, the detector 10 is a CCD (Charge Coupled Device) digital camera, for example, a Vosskühler GmbH:CCD 1300 CCD digital camera.

A motion controller 11 is provided to effect relative movement between the sample surface 7 and the reference mirror 6 so as to change the difference in the lengths of the paths travelled by light reflected from the reference mirror 6 and light reflected from the sample surface 7. As shown in FIG. 1, the motion controller 11 is arranged to move the reference mirror 6 along the reference path RP. This is equivalent to moving the sample surface 7 along a scan path in the Z direction shown in FIG. 1.

The detector 10 is arranged to capture or sense the light intensity (i.e. the interference pattern) at intervals as the reference mirror 6 is moved. In this example, the detector captures or senses the light intensity at intervals corresponding to movement of the reference mirror 6 by 75 nm. 2D image or frame data representing the intensity pattern for the field of view of the detector 10 is acquired by the detector 10 at each interval.

The intensity of the illumination sensed by one sensing element of the 2D sensing array (that is the portion of the interference pattern provided by light reflected from the corresponding region or surface pixel of the sample surface 7 imaged on that sensing element) varies as the path length difference changes with movement of the reference mirror 6, resulting in a series of fringes which have a coherence peak at the position along the scan path corresponding to zero path length difference. FIG. 2 shows a graph of light intensity against position Z to illustrate the change in intensity of the light sensed by a sensing element of the 2D sensing array of the detector 10 (and thus the interference fringe region) as the relative positions of the reference mirror 6 and sample surface 7 change. The envelope of the intensity distribution is the Fourier transform of the spectral distribution of spatial frequencies in the broadband source.

As is well known in the art of surface metrology, although the surface 7 may be nominally flat, the surface may have some surface form and surface roughness so that different regions or surface pixels of the surface have different heights. The position or point along the scan path at which the coherence peak occurs will be different for surface pixels at different heights. Accordingly, the surface profile or topography of an area of a surface imaged by the detector 10 can be determined by conducting a measurement operation during which the motion controller 11 causes effective movement along the scan path and images are captured at intervals by the detector 10, and by then analysing the results to determine the coherence peaks for each surface region or pixel imaged by the detector 10.

The data processing and control apparatus 3 has control apparatus 30 for controlling operation of the interferometer system 2, a data processor 32 for processing data received from the interferometer system 2 under the control of the control apparatus 30 and a user interface comprising a user input 31 and a user output 36 for enabling a user or operator to control operation of the control apparatus (and thus of the surface profiling apparatus) and for enabling the user or operator to be provided with a data output representing the results of processing by the data processor 32 of the data acquired during a measurement operation and also for enabling messages such as error messages to be communicated to the user. In the example shown in FIG. 1, the user input 31 comprises a keyboard 31a and a pointing device 31b such as a mouse while the user output device 36 comprises a display 36a.

The data processor 32 is arranged to process data provided by the detector 10 to determine the surface profile or surface typography of a surface imaged by the detector 10 by determining, for each surface pixel in-the surface area imaged by the detector 10, the position along the scan path at which the coherence peak or a position having a predetermined relationship to the coherence peak (for example a position half way down the coherence peak curve from the actual peak) occurs.

Figure 3:
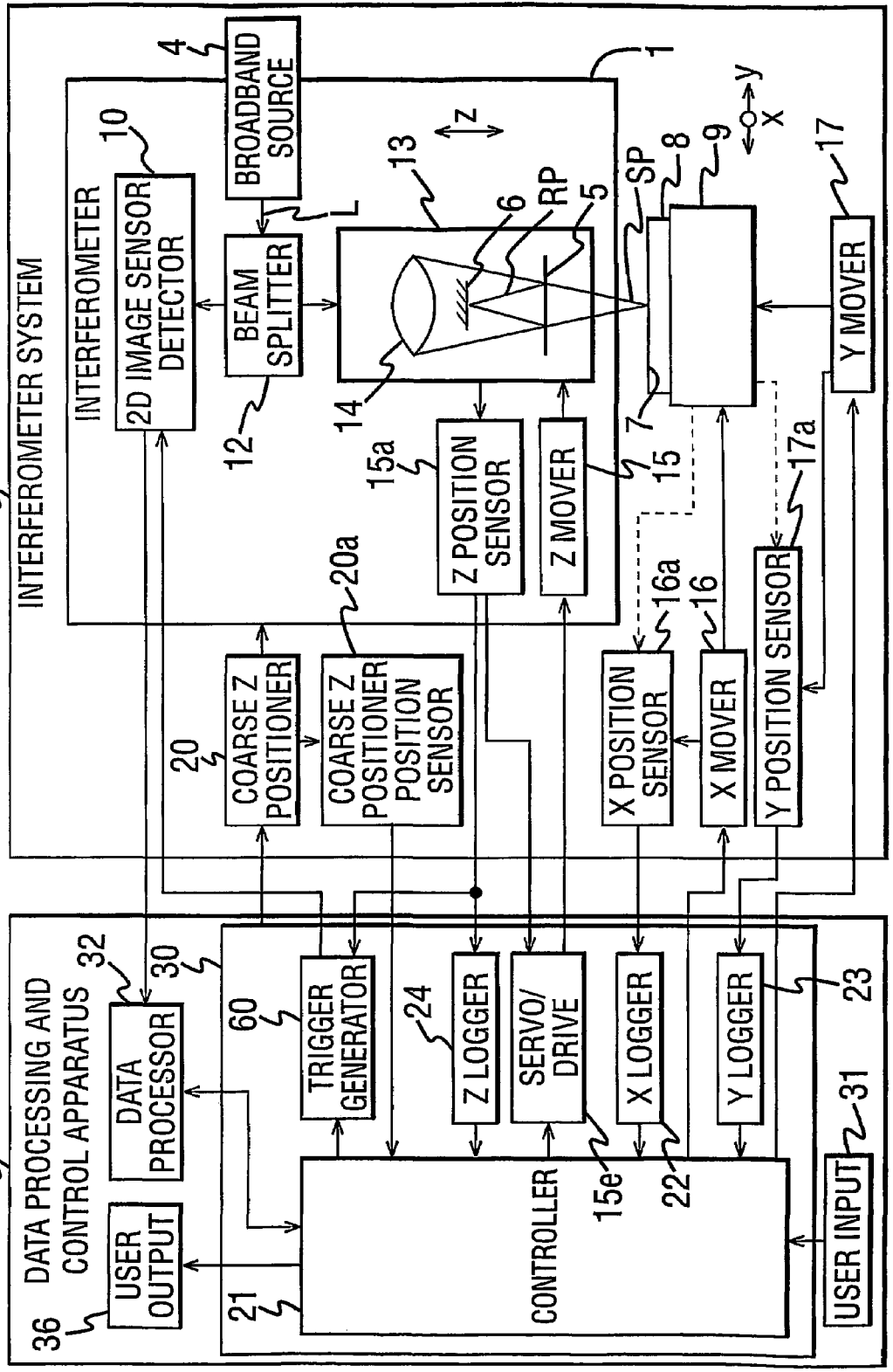
FIG. 3 shows a functional block diagram of surface profiling apparatus.
Figure 4:
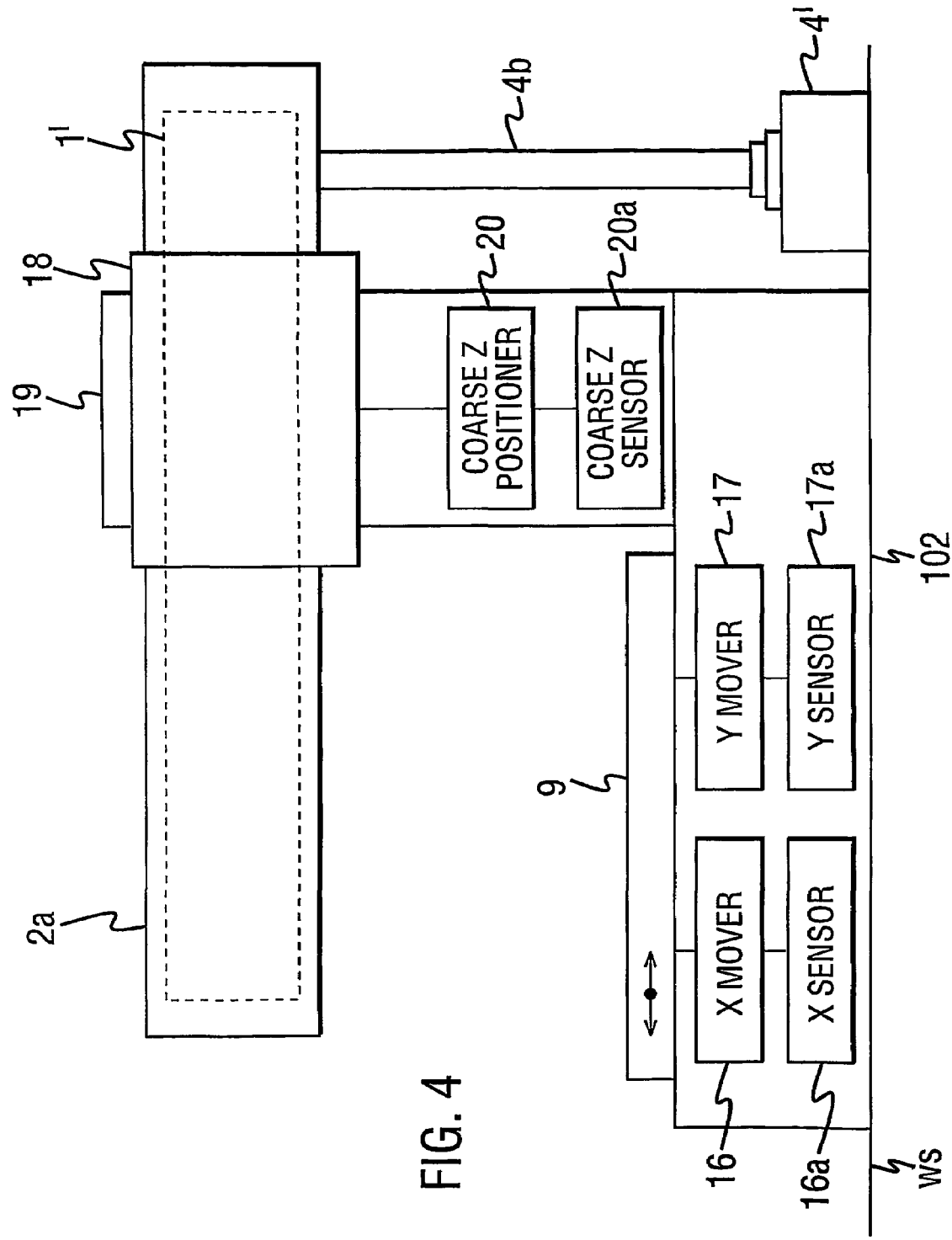
FIG. 4 shows a simplified side-elevational, part sectional view of the surface profiling apparatus shown in FIG. 3 but excluding the control apparatus.
Figure 5:
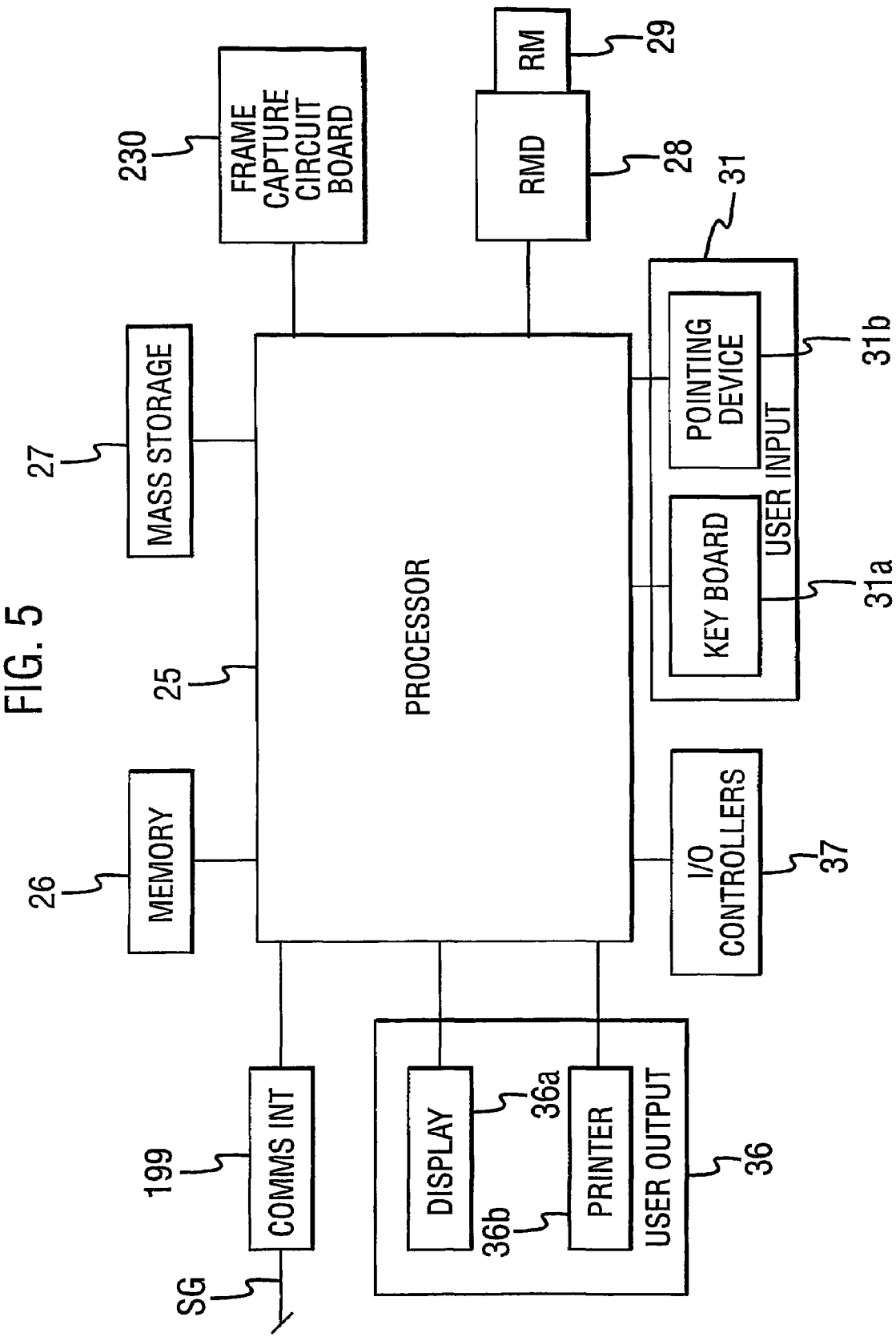
FIG. 5 shows a functional block diagram of computing apparatus that may be configured to provide the control apparatus shown in FIG. 3.
Figure 6:
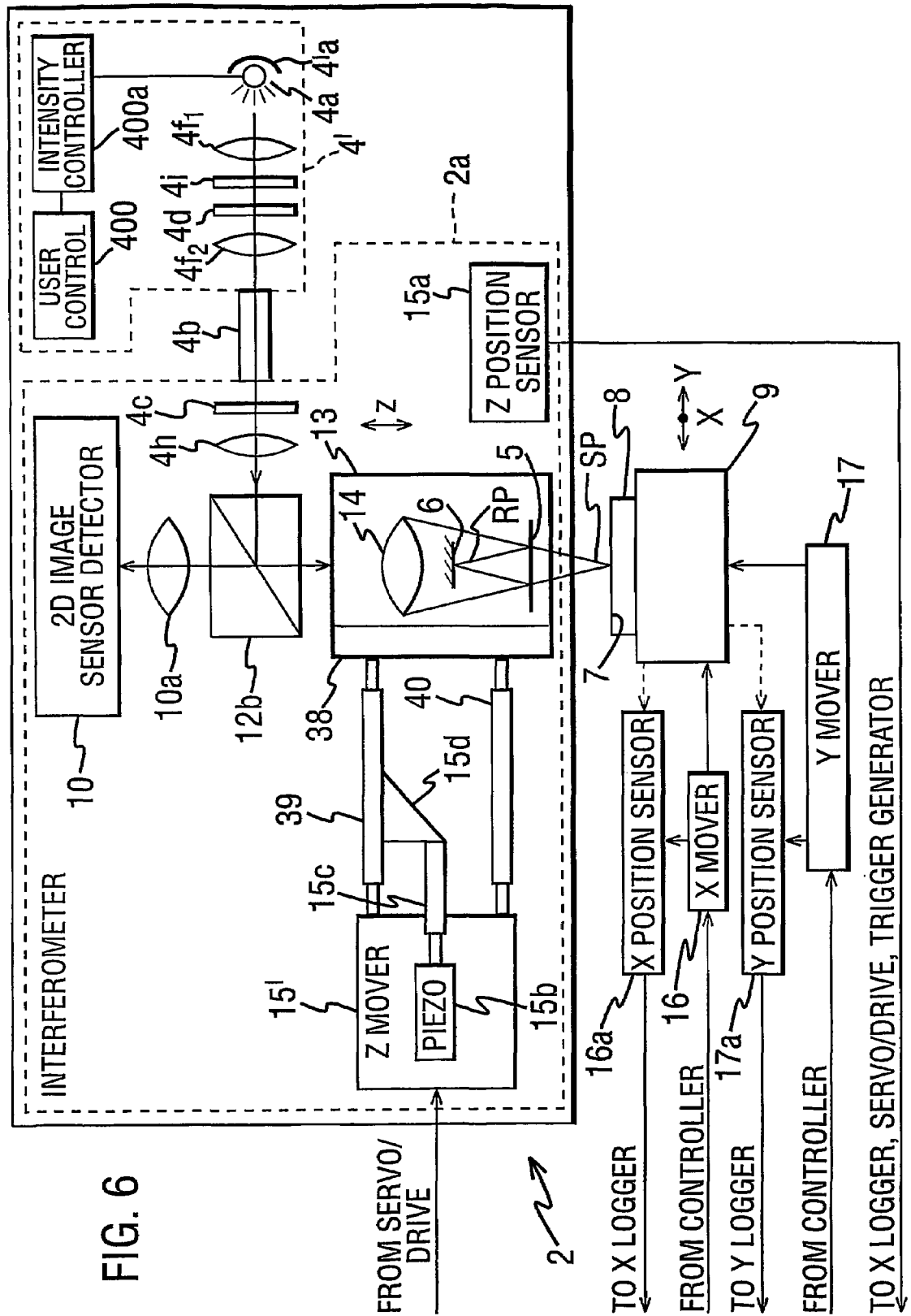
FIG. 6 shows a diagram for illustrating one example of an interferometer that may be used in the surface profiling apparatus.
Figure 7A:
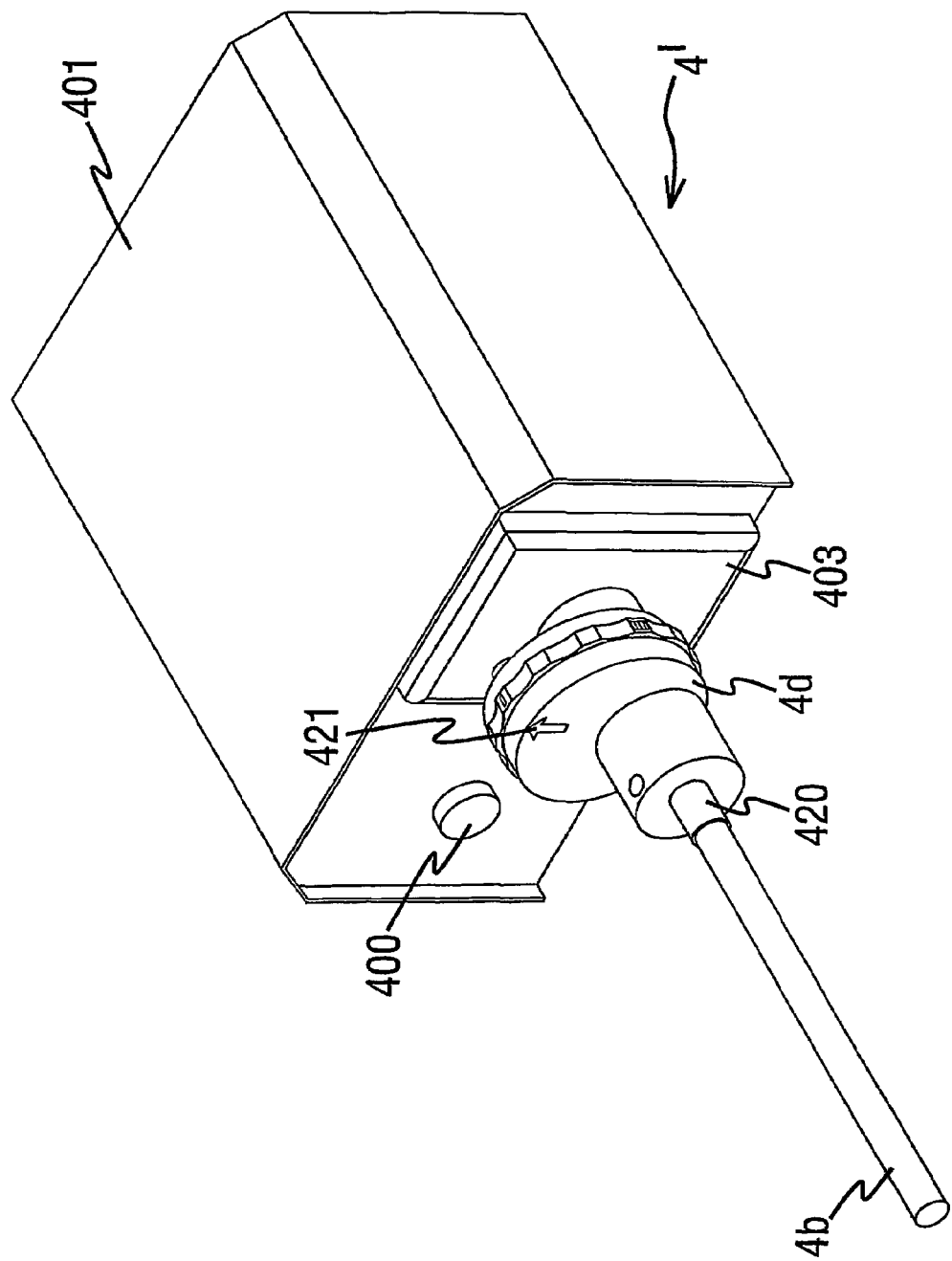
FIG. 7a shows a diagrammatic perspective view of a broadband source suitable for use in the interferometer system of FIG. 1.
Figure 7B:
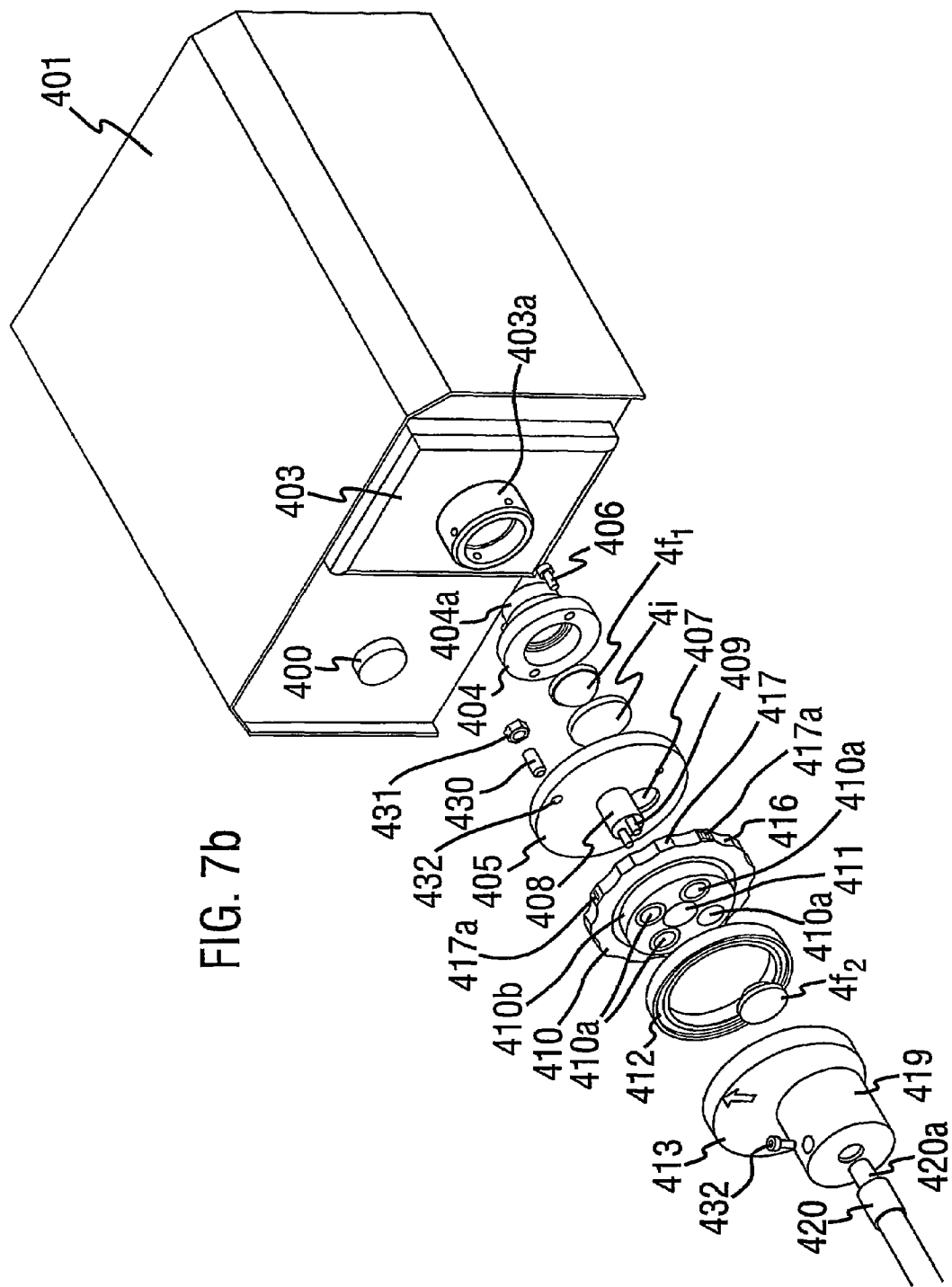
FIG. 7b shows a diagrammatic perspective view of the broadband source shown in FIG. 7a with a portion shown exploded apart to illustrate its component parts.

One example of a surface profiling apparatus in which the interferometer has a Mirau configuration will now be described in detail with reference to FIGS. 3 to 7b in which FIG. 3 shows an overall functional block diagram of the surface profiling apparatus, FIG. 4 shows a simplified side elevational view of the apparatus, FIG. 5 shows a block diagram of computing apparatus suitable for providing the data processing and control apparatus 3, FIG. 6 shows a more detailed diagram of part of the broadband scanning interferometer system 2 and FIGS. 7a and 7b show an example of a broadband light source suitable for use in the interferometer system 2.

Referring firstly to FIG. 3, an interferometer I of the broadband scanning interferometer system 2 has a broadband source 4, typically comprising a quartz halogen lamp, which directs broadband light L via a beam splitter 12 to an objective lens assembly 13 which includes, in addition to an objective lens 14, the beam splitter 5 and the reference mirror 6. The beam splitter 5 splits the light beam provided by the beam splitter 12 into a first reference beam that is directed along the reference path RP and a second sample beam that is directed along the sample path SP from the interferometer I towards the surface 7 of the sample 8 mounted on the sample support stage 9.

The objective lens assembly 13, and thus the reference mirror 6, is movable in the Z direction by a Z direction mover 15, in this example a piezoelectric mover, under the control of servo/drive circuitry 15e of the control apparatus 30. The sample support stage 9 is movable in X and Y directions by an X mover 16 and a Y mover 17, respectively, to enable different areas of the sample surface 7 to be brought within the field of view of the detector 10.

FIG. 6 shows a diagram of part of the interferometer system to illustrate in greater detail one configuration for the broadband scanning interferometer I. In this example, the broadband source 4 comprises a quartz halogen projector bulb 4a having an associated reflector 4'a. The projector bulb 4a is coupled to an intensity controller 400a for controlling the light intensity output of the projector bulb 4a in response to operation of the user control 400. The projector bulb 4a is optically coupled to an optical fibre cable 4b from which light is transmitted via an aspheric lens 4/1, a "hot mirror" 4i (that is a thin film dielectric filter designed to reflect infrared radiation back towards the light source and away from the remaining components of the interferometer), a filter assembly 4d comprising, as will be described in greater detail below with reference to FIGS. 7a and 7b, a set of exchangeable filters including a neutral density filter and one or more band pass filters designed to restrict the wavelength range of the light emitted by the broadband source, and a further aspheric lens 4f.

Typically the optical fibre cable 4b will be several feet long, in this case about 4 feet (about 1200 mm), allowing the projector bulb 4a to be placed in a separate housing 4' to facilitate changing of the bulb when necessary and more importantly keeping the heat source provided by the bulb 4a away from the remainder of the interferometer.

The light beam L emerging from the optical fibre cable 4b is supplied via a diffuser 4c and a further aspheric lens 4h to the beam splitter 12 which, in this case, consists of a beam splitting prism 12b.

Aspheric lenses 4/1, 4/2 and 4h are used to improve the field of view. However, if this is not a concern, the lenses need not be aspheric.

The beam splitting prism 12b reflects light towards the objective lens assembly 13. Light returned to the beam splitting prism 12b is directed through the beam splitting prism 12b towards the detector 10 and focussed onto the detector 10 by the lens 10a.

The objective lens assembly 13 is mounted on an objective support 38 coupled by parallel ligaments 39 and 40 to a Z mover housing 15' mounted to the interferometer housing 2a. In this case, the Z mover comprises a piezoelectric element (PIEZO) 15b coupled via a linkage 15c and a support 15d to one of the parallel ligaments 39 so that, when a voltage is applied to the piezoelectric element by the servo/drive circuitry 15e, the piezoelectric element changes shape causing the ligament 15c and support 15d to push the ligament 39 up or down causing the objective lens assembly 13 (and thus the reference mirror 6) to move along the scan path with the degree of movement being determined by the voltage applied to the piezoelectric element 15b.

As shown schematically in FIGS. 3, 4 and 6, the majority I' of the components of the interferometer I of the broadband scanning interferometer system 2 (apart from components of the light source prior to and including the optical fibre cable 4b) are mounted within a housing 2a mounted via a carriage 18 to a Z axis datum column 19. The fact that the components of the light source prior to and including the optical fibre cable 4b are outside the housing 2a is illustrated in FIG. 3 by showing the broadband source projecting from the housing 2a. The carriage 18 is coupled via a drive mechanism (not shown) such as a ball screw or lead screw drive mechanism to a coarse Z positioner 20 in the form of a manually operable control or, in this example, a DC motor that enables the carriage 18 and thus the interferometer I to be moved up and down the column 19 in the Z direction to enable the interferometer to be moved to different scanning start positions.

The components of the broadband source subsequent to the optical fibre cable 4b (that is, in this case, the diffuser 4c and lens 4h) are provided within the housing 2a mounted via the carriage 18 to the z-axis datum column 19. The optical fibre cable 4b allows the remainder of the components of the broadband source to be provided in a separate light source assembly 4' which, as shown in FIG. 4, can be mounted on a work surface WS adjacent to the remainder of the apparatus so that the heat generating light bulb 4a is remote from the interferometer.

As shown in FIG. 4, a support 102 houses the X and Y movers 16 and 17 and supports the sample support stage 9. The X and Y movers 16 and 17 comprise in this example DC motors coupled to the sample support stage 9 by appropriate conventional drive mechanisms such as rack and pinion or ball screw drive mechanisms (not shown).

As shown in FIGS. 3 and 4, each of the Z, X and Y movers is associated with a corresponding position sensor 15a, 16a and 17a while the coarse Z positioner 20 may be associated with a coarse Z positioner position sensor 20a. The control apparatus 30 has a controller 21 that controls overall operation of the interferometer system 2 and communicates with the user input 31, data processor 32, user output 31 and other parts of the control apparatus 30 which, in this example, consist of the servo drive circuitry 15e and x, y and z loggers 22, 23 and 24, each of which receives the output of the corresponding position sensor 15a, 16a, and a trigger generator 60 for triggering operation of the detector 10 in response to the output of the Z position sensor 15a to capture images at the required intervals. The controller 21 also receives an output from the coarse Z positioner position sensor 20a, if provided. The controller 21 may be programmed in known manner to compensate for any error in the Z position due to the slight arcuate nature of the motion of the objective lens assembly 13.

In the case of the X or Y mover 16 or 17, where the mover is a motor, then the corresponding position sensor may be a linear grating encoder. The dashed lines between the support stage 9 and the X and Y position sensors 16a and 17a in FIG. 3 indicate that the position sensors may sense movement of the support stage 9 directly rather than by signals derived from the corresponding motor. Where the Z mover 15 is a piezoelectric mover, then the position sensor 15a may be, for example, an interferometric system, such as a grating system, or an LVDT that provides signals representing movement of the objective lens assembly 13 relative to the housing 2a of the interferometer. For example, the housing of the objective lens assembly 13 may carry a diffraction grating and a fringe detection interferometric system may be mounted within the housing 2a, providing a count of the fringes to the Z logger 24 as the objective lens assembly 13 moves relative to the housing 2a. As another possibility, a capacitive sensor may be used. As a further possibility a Michelson interferometer (with a corner cube attached to the housing 13) may be used.

FIGS. 7a and 7b show diagrammatic perspective views illustrating one example of the light source assembly 4'. The light source assembly 4' has a housing 401 containing the light bulb 4a, associated reflector 4'a and drive circuitry (not shown) for controlling the light intensity of the output of the light bulb 4a in accordance with operation by the user of the light source intensity level control knob 400.

A support plate 403 is mounted to an outlet aperture of the light source housing 401. The support plate 403 has a mounting collar 403a that receives an annular coupling portion 404a of a lens mount 404 within which is mounted the aspheric lens 4f1.

The filter assembly 4d has a back plate 405 secured to a front flange 404b of the lens mount 404 by means of coupling screw 406 so that a filter window or aperture 407 of the back plate 405 is coaxial with the optical axis of the light source 4a. The hot mirror 4i is mounted in a countersunk bore (not visible in the Figures) in the back surface of the back plate 405.

A boss 408 projecting axially from a front surface 405a of the back plate 405 extends through an axial aperture 411 of a filter carrier disc or carousel 410.

The filter carrier disc 410 has a cylindrical projection 410b carrying, in this example, four filters 410a equally angularly spaced about the axial aperture 411 so that each filter 410a can be brought into registration with the filter aperture or window 407. In this example, the four filters comprise a neutral density filter, a 40 nanometer band pass filter, a 10 nanometer band pass filter and a 1 nanometer band pass filter. In this example, the filters are HeNe (Helium Neon) filters, that is the central wavelength of the pass band is 633 nm (nanometers). The latter extremely narrow wavelength range filter is provided, as will be described below, to facilitate focussing of the interferometer system 2.

A front plate 413 of the filter assembly carries a lens mount (not shown) for mounting the lens 4f2 on the optical axis. An annular bearing 412 is secured (for example glued) onto the cylindrical surface of the projection 410b and a cylindrical bore (not visible in FIG. 7b) in the front plate. The front plate 413 of the filter assembly is secured to the back plate by screws 409 passing through the boss 408 into the front plate 413 and the annular bearing 412 allows the filter carrier disc or carousel 410 to rotate relative to the front and back plates.

Although not visible in FIG. 7b, the back surface of the filter carrier disc 410 carries four v grooves or notches, one radially aligned with each filter. A spring biassed plunger 430 held in place by a nut 431 extends through an aperture 431 in the back plate so as to be biassed into engagement with a v groove or notch when aligned therewith. The filter carrier disc or carousel 410 thus has four indexed positions defined by the v grooves and spring biassed plunger 430. The filter carrier disc or carousel 410 can thus be manually rotated relative to the rear and front plates of the filter assembly 4d to bring each of the filters in turn into alignment with the aperture 407.

To assist the user in rotating the filter carrier disc 410 to bring a filter into registration with the filter window or aperture 407, a peripheral ring 414 of the filter carrier disc 410 has equally angularly spaced cut away portions 416 defining therebetween land portions 417 (twelve in this example) with every third land portion 417a being radially aligned with a corresponding filter 410a and being ridged or grooved so that a user can determine by touch a land portion corresponding with a filter.

The lands 417a radially adjacent the different filters 410a may be individually distinguishable, for example, the different lands may have different numbers of ribs or grooves so that a user can differentiate between the different lands by touch and can select a particular filter without having to look at the filter assembly. As another possibility or additionally, the different lands may be visually distinguishable, that is they be of different colours.

A front face of the front plate 413 of the filter assembly carries a coupling member 419 having a coupling aperture for receiving a coupling portion 420 of the optical fibre 4*b* and a cooperating Allen screw 432 and aperture for holding an end 420*a* of the optical fibre cable coupling portion 420 securely in place. As shown in FIG. 7*a*, the filter assembly may carry one or more indicia (a single arrow 421 is shown in FIGS. 7*a* and 7*b*) to enable a user to determine visually which filter is currently aligned with the filter aperture or window.

The light source assembly 4' described above and the filter assembly 4*d* in particular enable a user rapidly and easily to change from one filter to another so that, for example, the neutral density filter can be used for normal coherence or broadband scanning interferometry while the 40 nanometer and 10 nanometer band pass filters can be used for sub-Nyquist scanning and the very narrow bandwidth 1 nanometer filter can be used for focussing as will be described below without the user having to access any internal components of the interferometer system. Moreover, the peripheral surface of the filter assembly 4*d* enables a user rapidly to locate the required filter in front of the filter window or aperture 407 without having to look at the filter assembly so that the user can concentrate on images being displayed to him or her while adjusting the filter assembly 4*d*.

The control apparatus 30 may be implemented by programming computing apparatus, for example a personal computer. FIG. 5 shows a simplified block diagram of such computing apparatus. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) controllers 37 for interfacing with the components of the broadband scanning interferometer system to be controlled by the control apparatus (for example, the Z, X and Y movers 15 to 17, the coarse Z positioner 20 and the detector 10) to enable the processor 25 to control operation of these components, the user input 31 consisting, in this example of the keyboard 31*a* and pointing device 31*b*, and the user output 36 consisting, in this example, of the display 36*a* (which may be a CRT or LCD display) and a printer 36*b*. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet. In this example, the data receiver 33 is provided as a dedicated frame capture circuit board 230 installed within the computing apparatus.

The processor 25 may be programmed to provide the control apparatus 30 shown in FIG. 3 by any one or more of the following ways:

1. by pre-installing program instructions and any associated data in a non-volatile portion of the memory 26 or on the mass storage device 27;
2. by downloading program instructions and any associated data from a removable medium 29 received within the removable medium drive 28; and
3. by downloading program instructions and any associated data as a signal SG supplied from another computing apparatus via the communications interface 199.

The computing apparatus, when programmed by program instructions to provide the control apparatus 30, enables a measurement operation to be controlled in accordance with instructions received by a user, and the resulting frame data supplied by the detector 10 to be analysed to determine the surface profile or topography of the area of the surface imaged onto the 2D array of the detector 10.

The surface profiling apparatus is operable in a set up mode that enables a user or operator to set up operating parameters for the sample surface to be measured.

Figure 8:
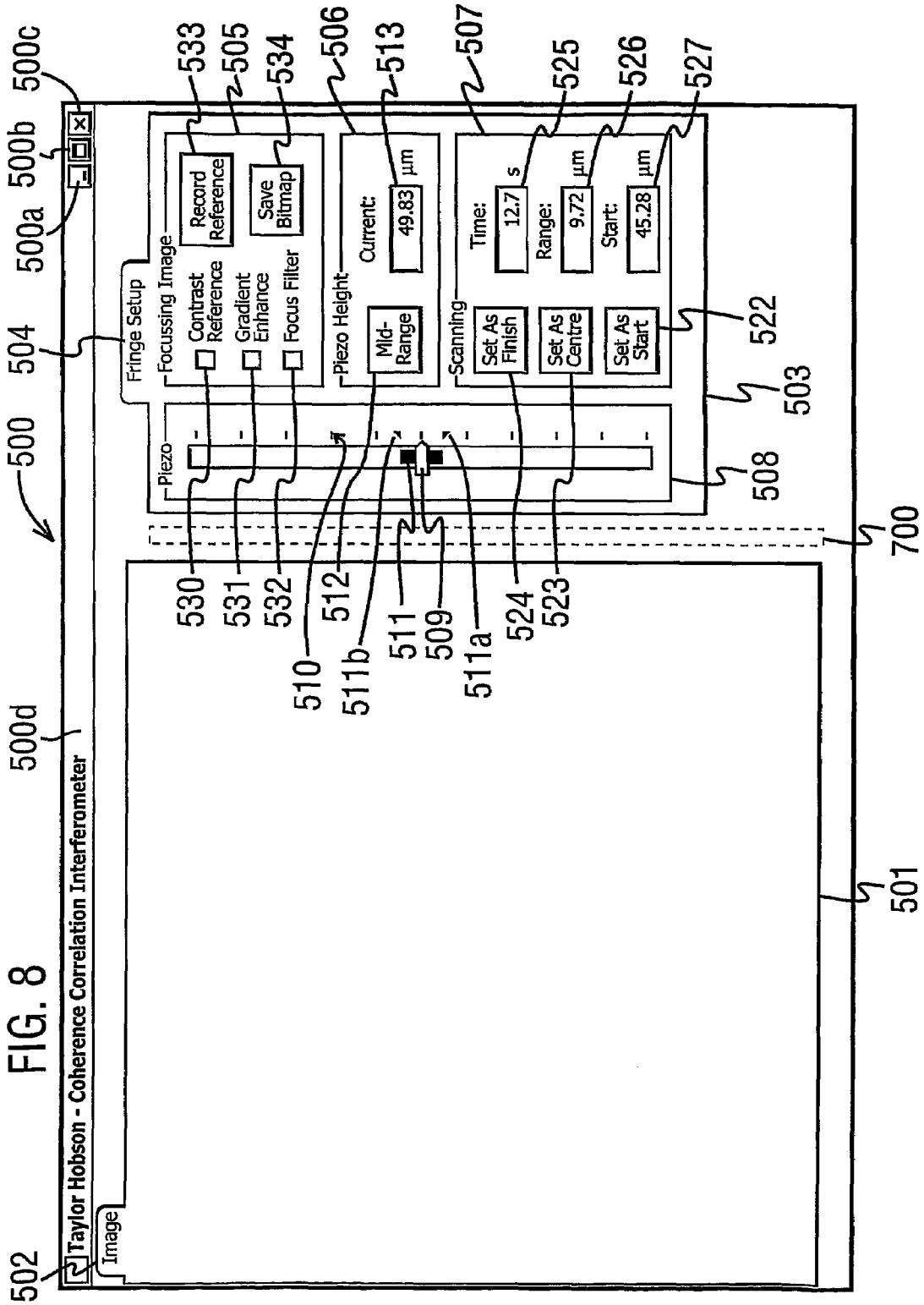
FIG. 8 shows a diagrammatic representation of a display screen displayed to a user by a display of a user interface of the surface profiling apparatus in a set up mode.

FIG. 8 shows very diagrammatically a display screen 500 that the control apparatus 30 causes the display 36*a* to display to the user in the set up mode to enable the user to set up the surface profiling apparatus.

As shown in FIG. 8, the display screen 500 has a Windows style appearance with a minimise button 500*a*, a close button 500*c*, a title bar 500*d* and optionally a maximise button 500*b*.

The working area of the display screen 500 has a first tabbed window 501 having a tab title bar "image" 502 and a second tabbed window 503 having a tab title bar "fringe set up" 504.

The window 501 is configured to display an image or frame acquired by the 2D image sensor detector 10 while the window 503 is configured to provide a user with a number of tools or operational functions to aid the user in setting up of the scan path for a measurement operation.

The window 503 has a first border 505 labelled "focussing image" bounding user selectable functions relating to focussing of an image, a second border 506 labelled "piezo height" encompassing a user selectable option for selecting a height for the piezoelectric Z mover, a third border 507 labelled "scanning" encompassing user selectable scanning parameters and a fourth border 508 labelled "piezo" encompassing a piezo range scale 510, a pointer or slider bar 509 for indicating the current position of the Z mover 15, and a measurement range bar 511 indicating the range of z movement set for a measurement operation, the measurement range bar 511 being associated with scan end markers 511*a* and 511*b* for indicating the ends of the measurement path. The slider bar or pointer 509 is movable by a user to enable the user to change the current location of the Z mover 15.

The piezo height border 506 encompasses a button 512 which, when selected by a user using the pointing device, causes the control apparatus 30 to move the Z mover 15 to the mid-point of its operational range and to move the slider bar or pointer 509 to the corresponding position on the scale 510 so that it still shows the current position of the Z mover 15, and a window 513 that displays, in micrometers (µm), the current position of the Z mover 15 relative to a nominal zero position, that is the position of the Z mover corresponding to the position set by the coarse Z positioner 20. The window 513 displays the actual current position of the Z mover 15 but is configured to enable a user to overtype the current position using the keyboard to cause the control apparatus 30 to move the Z mover 15 to the new current position specified by the user as an alternative to moving the slider bar or pointer 509.

The scanning border 507 encompasses three buttons labelled "set as finish", "set as centre" and "set as start" 524, 523 and 522 that are configured to be used in combination with the slider bar or pointer 509 to enable a user to identify a selected position of the slider bar or pointer 509 to the control apparatus 30 as a finish, centre and start positions for a measurement operation. The scanning border 507 also encompasses three windows 525, 526 and 527 that are arranged to display a scan time (in seconds), and scan range and scan start position (both in micrometers). As in the case of the window 513, the scan range and scan start position windows are configured so that a user can overtype the data to cause the controller to modify the range and start position, as the case may be, in accordance with the data input by the user using the keyboard.

The slider bar or pointer 509 and measurement range bar 511 and associated end markers 511a and 511b are configured to provide the user with a clear visual representation and control over the relationship between the measurement path range represented by the measurement range bar 511, the range being represented by the measurement range bar 511 and the start and end of the measurement path of the piezoelectric Z mover being represented by the end markers 511a and 511b (the actual scan path of the Z mover 15 may include an initial run up portion and a final run down portion beyond the measurement path to enable frames of data to be acquired to enable data analysis over the entire length of the measurement path). The mid-range button 512 enables the user easily to cause the Z mover 15 to move to the middle part of its range of movement to ensure that the Z mover 15 is operating in mid-range and not at the extremes of its operational range.

The focussing image border 505 encompasses check boxes 530, 531 and 532 for enabling a user to instruct the control apparatus 30 select contrast, reference, enhancement, gradient enhancement and a focus filtering mode of operation, respectively. The focussing image border 505 also encompasses a user selectable button 533 for enabling a user to instruct the control apparatus 30 to record a reference image for use in contrast reference enhancement processing as will be described below and a save bitmap user selectable button 534 for enabling a user to save an acquired image as a bitmap for subsequent processing.

As an initial step prior to a measurement operation, the user needs to determine the approximate interference fringe region in which the coherence peaks will be found, that is the region in which interference fringes will be present in images acquired by the 2D image sensor 10, so that the scan path can be defined to encompass the interference fringe region without having an unnecessary long scan path (which would result in unnecessary expenditure of scanning time, processing and data storage capacity). The user selectable functions within the focussing image border 505 facilitate determination by the user of the coherence peak or interference fringe region as will be described below.

In operation, having positioned the surface to be measured on the support stage 9, the user selects the set up mode which causes the surface profiling apparatus to display the set up mode screen shown in FIG. 8 and to capture an image and to display the image in the window 501.

Usually, the interference fringe region will not be visible in the initial captured image and the user will need to adjust the height or Z position of the reference mirror 6 using the coarse positioner 20 until the interference fringe region is in focus in the image. The operator may as an initial step select the mid-range button 512 to ensure that the Z mover 15 is at its mid position so that the Z mover can be operated in its midrange region (which should be the best operation region) during a measurement operation.

The interference fringe region can be difficult for a user to detect, particularly where a sample surface is not very reflective so that light reflected from the sample surface may be swamped by light reflected from the reference mirror. The contrast reference enhance and gradient enhance functions selectable by the user by selecting the check boxes 530 and 531, respectively, enable a user to select image processing functions that process the image data supplied by the 2D image sensor detector 10 to enhance the visibility of the fringes and so facilitate detection of the region of interference by the user.

The operation of the gradient enhancement function will now be described with the assistance of the flow chart shown in FIG. 9.

Thus, when the user checks the gradient enhance check box 531, then for each frame of image data captured by the 2D image sensor detector 10 to be displayed in the window 501, the control apparatus 30 reads the pixel intensity values at S1 which will lie in the range to 0 to 255.

Then at S3, for each intensity value, the control apparatus 30 determines a gradient value representing a local light intensity gradient and modifies that pixel intensity value in accordance with that gradient value to produce a modified intensity value $I_M$.

In the present case, the control apparatus 30 determines the local intensity gradient for the surface region or pixel at coordinates x, y in the 2D array of surface regions or pixels by:

(1) obtaining the intensity value $L_1$ for the surface region at coordinates (x−1, y−1) and the intensity value $I_{+1}$, for the surface regions at coordinates (x+1, y+1);
(2) determining the difference between $I_{-1}$ and $I_{+1}$;
(3) multiplying this difference by 4; and then
(4) adding the resulting value to an adjusted intensity value (I/2+64) to produce a modified pixel intensity value $I_M$.

Thus, in summary, in this case, the control apparatus 30 computes equation (1) below:

$$I_M = 64 + I/2 + (I_1 - I_{+1}) \times 4 \tag{1}$$

The intensity value I is adjusted to reduce the possibility of the resulting modified values being outside the range of pixel display values, in this case 0 to 255, available in the display mode being used. Any modified values that do lie outside this range are subsequently adjusted so that, in this example, any below zero are set to zero and any above 255 are set to 255. It will of course be appreciated that different display modes may require different adjustments (or possibly no adjustment) to the intensity value.

The control apparatus 30 computes equation (1) for each non-peripheral intensity value, that is each intensity value not falling on the border of the imaged area.

Where a surface region or pixel is at an edge of the area imaged, then it will, of course, not be possible to use intensity values for pixels on one side of the pixel of interest to determine the local gradient. In this case, the intensity value of a single pixel located diagonally of the pixel of interest may be used. For example, where the intensity value is at x-y coordinates 0,0 in the image, where 0,0 represents the lower most left hand corner, then the local gradient may be determined using the intensity value at $X_{+1}, Y_{+1}$ and the intensity value of the pixel of interest with a scaling factor to account for the fact that the gradient is measured over a shorter distance, for example the difference may be multiplied by 8 rather than 4, as follows:

$$I_M = 64 + I/2 + (I - I_D) \times 8 \tag{1a}$$

where $I_D$ is the intensity value for the pixel located diagonally of the peripheral pixel. Again, any modified values outside the required range are adjusted so that, in this example, any below zero are set to zero and any above 255 are set to 255. As another possibility, the peripheral pixels may simply be ignored.

When the control apparatus 34 has completed all of the modified intensity values $I_M$, then at S4 the control apparatus 30 causes the display to display the frame of image data using the modified pixel intensity values $I_M$ in the window 501.

The control apparatus 30 is configured to carry out the processing described above with reference to FIG. 9 for each acquired image during the set up procedure while the gradient enhancement check box 531 is checked.

Figure 10:
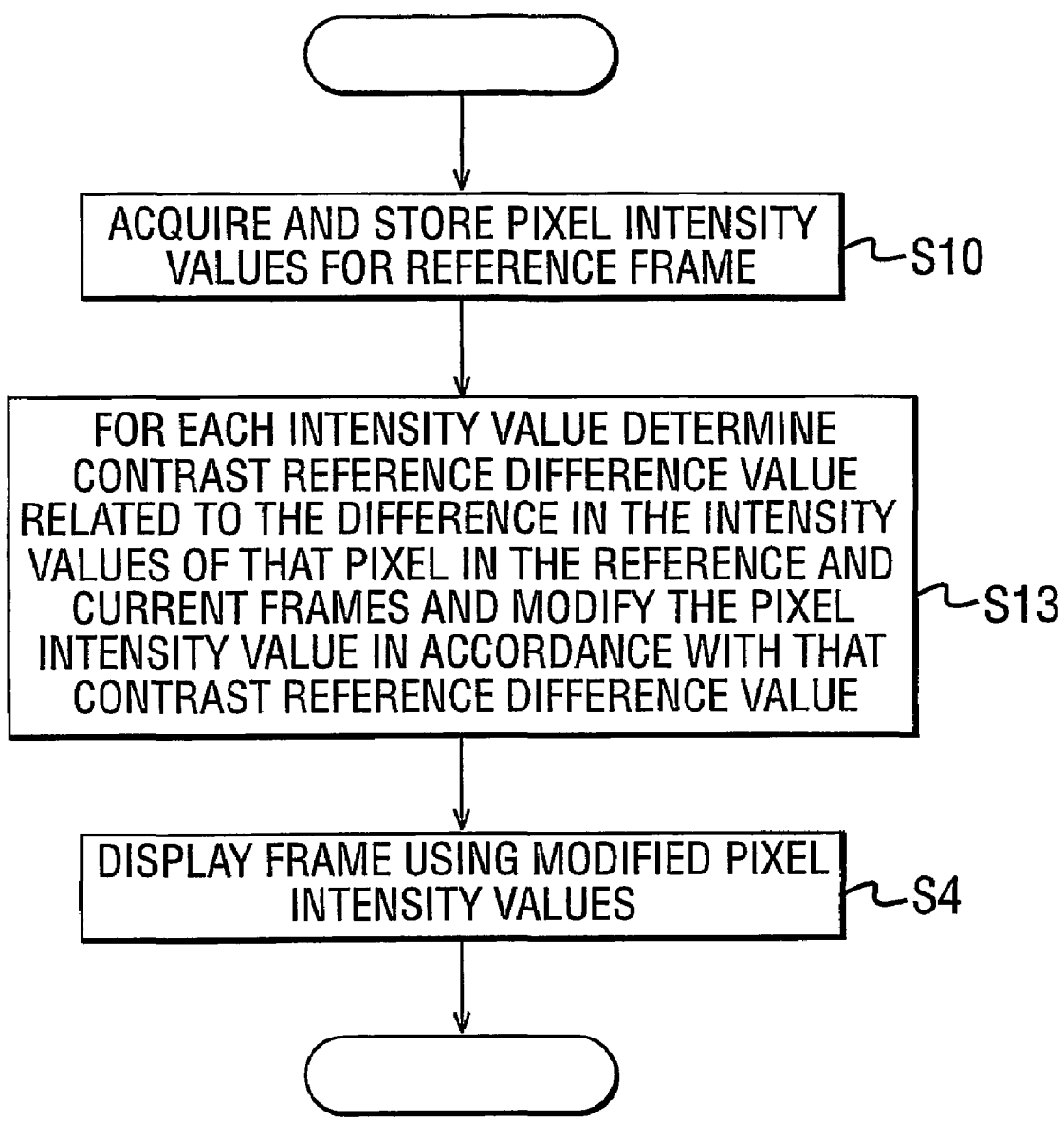
FIG. 10 shows a flow chart for illustrating steps carried out by the control apparatus to provide a contrast enhanced image.

FIG. 10 shows a flow chart for illustrating the functions carried out by the control apparatus 30 when the user selects or checks the contrast reference check box S30. In order for this function to be available, a contrast reference frame has previously to be stored, otherwise the contrast reference check box 530 is greyed out. Generally, to acquire the reference frame a user moves the Z mover 15 (for example by dragging the pointer 509) so that the Z mover 15 is at the top end of its range (or the interference fringes are at least out of focus) so that the displayed image has as uniform as possible intensity. When the user then selects the record reference button 533, the control apparatus 31 acquires and stores the pixel intensity values $I_R$ of the currently displayed frame as a reference frame at S10 in FIG. 10. Once a reference frame has been acquired, then the contrast reference check box 530 becomes available and is no longer greyed out. When the user then checks the contrast reference check box 530, then, at step S11 when a subsequent frame is received from the 2D image sensor detector 10, the control apparatus reads the pixel intensity values $I_C$ for that frame.

Then, at S13, for each pixel of the current frame, the control apparatus determines a contrast reference difference value related to the difference in the intensity value associated with that pixel in the reference frame (the reference intensity value) and the intensity value associated with that pixel in the current frame (the current intensity value) and then modifies the current intensity value using the determined contrast reference difference value to produce a modified intensity value $I_M$.

The control apparatus repeats these steps for each intensity value of the current image.

Then at S14, the control apparatus 30 causes the display to display image data representing the modified intensity values in the window 501.

In this example, the control apparatus 30 determines as the contrast reference difference value for a pixel a value which is four times the difference between the current and reference intensity values for that pixel and adds that contrast reference value to the re-ranged intensity value. Thus, in summary, at S13 in this case, the control apparatus 30 determines a modified intensity value $I_M$ for the pixel in accordance with equation 2 below:

$$I_M = 64 + I/2 + (I-I_R) \times 4 \quad (2)$$

Figure 11:
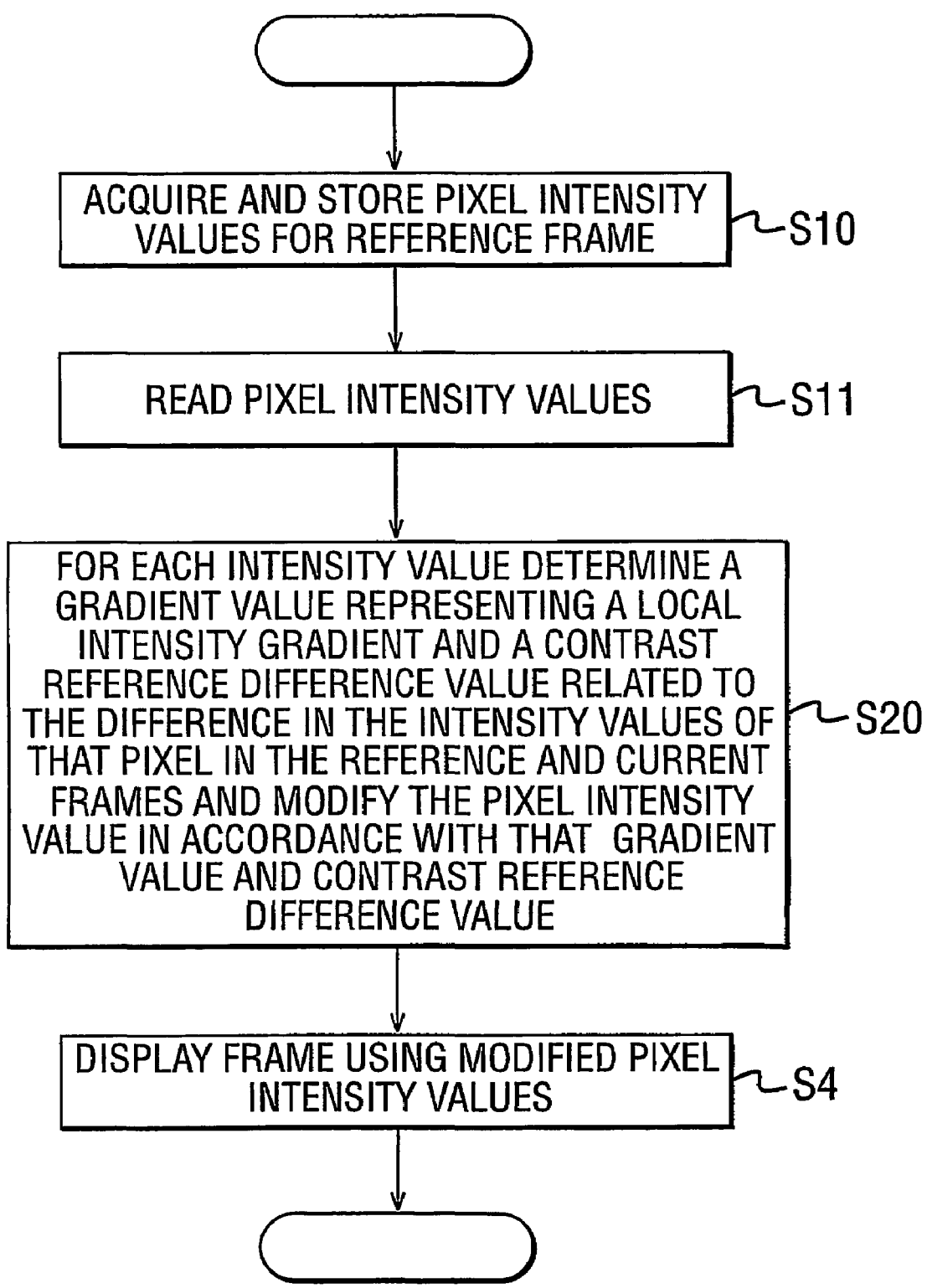
FIG. 11 shows a flow chart illustrating steps carried out by the control apparatus to provide a gradient and contrast enhanced image.

FIG. 11 shows a flow chart illustrating steps carried out by the control apparatus 30 if the user selects or checks both the contrast reference enhancement check box 530 and the gradient enhancement check box 531. Thus, in this case, the control apparatus again carries out S10 and S11 as described above with reference to FIG. 10. Then, however, at S20, for each pixel, the control apparatus determines the gradient value representing the local intensity gradient in addition to the contrast reference difference value and then modifies the current intensity value to produce the modified intensity value using both the gradient value and the contrast reference difference values. In this example, the gradient value and contrast reference difference value are obtained as described above and the current intensity value is modified by adding both the gradient value and the contrast reference difference value to the adjusted intensity value in accordance with equation 3 below:

$$I_M = 64 + I/2 + (I_{-1} - I_{+1}) \times 4 + (I - I_R) \times 4 \quad (3)$$

In this example, the light intensity values are represented by display pixels with different degrees of saturation (with the saturation decreasing with light intensity value or apparent lightness increasing with light intensity value) such that the display pixels range from a deep colour to a light colour or white. In this example the display pixels vary from deep blue to blue-white which is achieved by setting the R, G and B values for the display pixels to R=I, G=I and B=127+I/2.

Figure 12B:
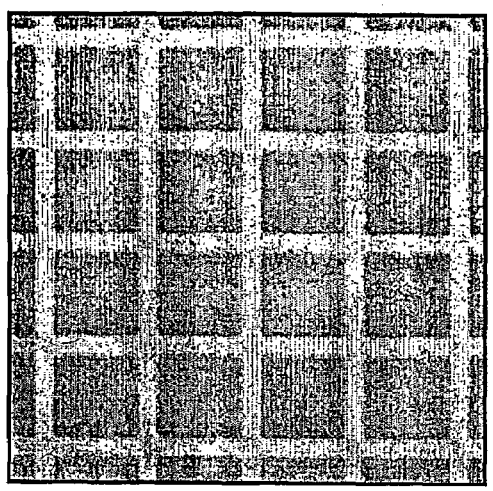
Figure 12C:
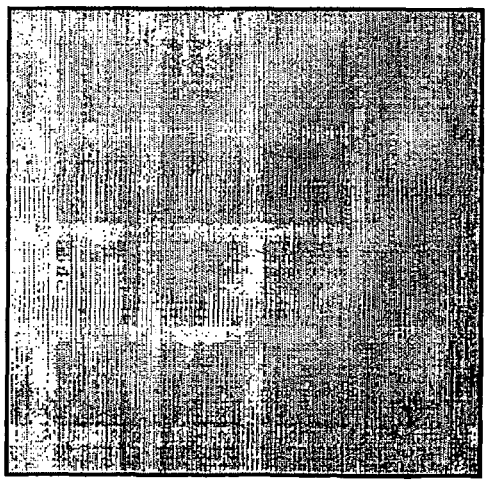
Figure 12D:
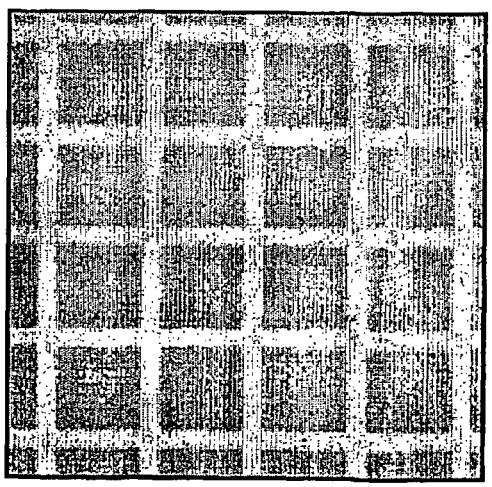

FIGS. 12a to 12d show grey scale representations of the images obtained of an area of a surface having a grid-like topography and displayed in the window 501 when no fringes are present, that is the interferometer is not focussed on the interference fringe region. FIG. 12a shows the image obtained when neither the contrast reference enhancement check box 530 nor the gradient enhancement check box 531 is selected; FIG. 12b shows the image obtained when the gradient enhancement check box 531 is selected and the control apparatus 30 carries out gradient enhancement processing as described above with reference to FIG. 9; FIG. 12c shows the image obtained when the contrast reference enhancement check box 530 is selected and the control apparatus carries out contrast reference enhancement processing as described with reference to FIG. 10; and FIG. 12d shows the image obtained when both the contrast reference enhancement and gradient enhancement check boxes 530 and 531 are selected and the control apparatus carries out both enhancement processes as described with reference to FIG. 11.

As can be seen by comparing FIGS. 12a to 12d, the image of FIG. 12a, that is the image without any enhancement processing, has ill-defined or fuzzy edges to the grid-like structure and also has a very low contrast level. In contrast, the image of FIG. 12b. that is the image with gradient enhancement processing, clearly defines the edges of the grid-like structure. The image of FIG. 12c shows much improved contrast compared to the contrast of the images shown in FIGS. 12a and 12b but, compared to the image shown in FIG. 12b, less distinct edges to the grid-like structure while the image shown in FIG. 12d, that is the image resulting from both gradient and contrast reference enhancement processing, shows both good contrast and well defined edges to the grid-like structure. Thus gradient and contrast enhancement processing separately enable surface features or structure in an image to be more easily identified by a user or operator and a combination of gradient enhancement and contrast reference enhancement processing makes such features or structures even more readily discernable.

FIGS. 13a to 13d show grey scale representations of the images obtained of the same surface area as shown in FIGS. 12a to 12d after the user has adjusted the Z position using the coarse Z adjuster 20 to bring the interference fringe region into focus.

In FIG. 13a, that is the image for which no enhancement processing has been carried out, the fringes are very indistinct and may easily be missed by a user when adjusting the Z position using the coarse Z positioner 20. In contrast, in the image shown in FIG. 13b where the intensity value data has been subjected to gradation enhancement processing, visual evidence of diagonally extending fringes is more clearly evident but the contrast between the light and dark fringes is still low. In the image shown in FIG. 13c where the intensity value data has been subject to contrast reference enhancement, although edges in the image are still fuzzy, light and dark fringes can easily be seen. In the image shown in FIG. 13d for which the intensity value data has been subject to both gradation enhancement and contrast reference enhancement processing, the image is both sharp and of good contrast enabling the fringes to be seen very easily.

Dependent upon the reflectance characteristics of the particular surface being measured, then gradation enhancement or contrast reference enhancement alone may be sufficient to make the fringes clearly visible to a user. Particularly where the measurement surface is of very low reflectance such as a glass surface, contrast reference enhancement is particularly useful because it enables fringes that would otherwise be very difficult to see with the human eye to be visible to the user or operator. The techniques described above with reference to FIGS. 9 to 11 and illustrated by the images shown in FIGS. 12a to 12d and 13a to 13d thus visually enhance surface features and interference fringes to enable a user or operator of the surface profiling apparatus to identify more easily and quickly the interference fringe region for a sample surface.

The images acquired by the 2D sensor detector 10 and displayed in the display window 501 are produced with the neutral density filter selected, that using a broadband light source. The use of a broadband light source ensures a short coherence distance so that the interference fringe region occurs over only a short distance enabling an accurate determination of the position of the coherence peak. However, because the fringes occur over only a very short distance in the Z direction (typically 1.5 micrometers for the neutral density filter), an operator may find it difficult to locate the interference fringe region during the initial set up procedure and may move the Z position past or through the interference fringe region without noticing when adjusting the Z position using the coarse Z positioner. The user can, however, simply by manually rotating the filter assembly wheel bring the focussing filter into alignment with the filter window or aperture 407 to restrict the wavelength range of the light source so that the interference region extends over a greater distance in the Z direction to give the user a greater chance of detecting the interference fringe region.

When electing to use the focussing filter to aid identification of the interference fringe region, the user can also further enhance the image obtained by checking the focus filter check box 532 shown in FIG. 8. FIG. 14 shows steps carried out by the control apparatus 30 when the focus filter check box 532 is selected. Thus, when at S30 the control apparatus 30 determines that the focus filter is selected, then at S31 the control apparatus processes the intensity value data received from the 2D image sensor detector 10 to increase the grey scale levels so that a lower intensity value is represented by a lighter coloured display pixel in the display window to compensate for the attenuation of the focussing filter. The control apparatus 31 may, if the 2D image sensor detector 10 allows, also raise the light sensitivity of the detector to increase the amount of light detected so as again to compensate for the attenuation of the focussing filter. In addition, the control apparatus may control the exposure time of the 2D image sensor detector 10 to make the interference fringe region more detectable at speed when a user is trying to find the location of the fringes by rapidly adjusting the Z position using the coarse Z position mover 20.

FIGS. 15 and 16 show grey scale representations of the images displayed in the display window 501 of FIG. 8 when the neutral density and focussing filter, respectively, are used. As can be seen from FIG. 15 when the neutral density filter is used, because the interference fringe region extends over a relatively short distance in the Z direction, only a small proportion of the fringes are sharply in focus in the image. In contrast, in the image shown in FIG. 16 acquired using the focussing filter, because the interference fringe region extends over a greater distance in the Z direction, the fringes extend over a greater area in the image and are more easily detectable by the user.

The focussing filter (alone or with the enhancement processing provided by the control apparatus 30 as discussed above), thus enables a user quickly to identify at least roughly the Z position of the interference fringe region. Once this has been identified, then the user may, if desired, refine the Z position by simply rotating the filter carrier disc 410 to return to the neutral density filter and then possibly selecting one or the other or both of the gradation enhancement and contrast enhancement processing options to focus more precisely on the interference fringe region.

As described above, the control apparatus 30 is arranged to cause the images displayed in the display window 501 to be displayed with the colour lightening or becoming less saturated with increasing light intensity value. In the above example, the colour varies from deep blue to blue-white with the colour displayed getting lighter as the intensity value increases. As described above, the user may manually adjust the light intensity level (that is the output of the broadband light source) for a particular sample so that the intensity values provided by the 2D image sensor detector lie within a desired range. In order to assist the user in determining the appropriate illumination level, the control apparatus 30 may be configured to modify the colours representing the intensity values so that the certain intensity values are in a different colour and so appear visually distinct, to assist the user in adjusting the light intensity.

FIGS. 17 and 18, show flowcharts for illustrating steps carried out by the control apparatus 30 for causing the display pixels corresponding to certain intensity values to appear visually distinct. Thus, at S40 in FIG. 17, the control apparatus 30 reads a first intensity value of a frame of image data supplied by the 2D image sensor detector 10 and at S41 selects R, G and B values in accordance with the read intensity value so that a colour change is provided if the read intensity value lies in a certain range of intensity values and then at S42 checks whether there are further intensity values in the frame to be read and, if so, repeats S40 and S41 until all intensity values have been read and processed. Then, at S43, the control apparatus causes the display to display in the window 501 an image in which each intensity value is represented by the combination of R, G and B values selected at S41.

FIG. 18 shows a flow chart illustrating in greater detail one way in which the R, G and B values may be selected. Thus, at S50, the control apparatus 30 checks whether the intensity value is zero and, if so, at S51 sets the R value to maximum and the G and B values to zero so that, when the resulting bitmap image is displayed on the display, the corresponding display pixel is red. If, however, the answer at S50 is no, then at S52, the control apparatus 30 checks whether the intensity value is equal to 255, that is the intensity value is saturated and, if so, at S53 sets R and G to maximum and B to zero so that the display pixel is yellow.

If the answer at S52 is no, then at S54 the control apparatus 30 checks whether the intensity value is greater than or equal to one and less than or equal to 127 and, if so, at S55 sets the R value equal to the received intensity value (R=I), the B value equal to 96 plus one half of the intensity value (B=96+I/2) and the G value equal to five times one quarter of the intensity value (G=5×I/4).

If, however, the answer at S54 is no, then at S56 the control apparatus again sets the R and B values to I and 96 plus one half of I respectively, but in this case sets the G value to 64 plus three times one quarter of the intensity value (G=64+3 I/4).

This processing is, as described with reference to FIG. 17 above, carried out for each intensity value of the received frame so that each intensity value is allocated to a combination of R, G and B values dependent upon the actual intensity value. FIG. 19 shows a graph of intensity values 1 to 249 against R, G and B values where the solid line L1 represents the red values, the dashed line L2 represents the blue values and the dotted line L3 represents the green value to illustrate how the three components change with intensity value. As can be seen from FIG. 19, at low intensity values the blue value is much higher than the red or green values so that the corresponding display pixels appear blue. The red and blue values both increase linearly with increasing intensity value with the red value increasing more sharply but starting from a lower value than the blue value so that at a certain intensity value lines L1 and L2 crossover. In contrast, the green value or component of the pixel colour increases relatively rapidly (more rapidly than both the blue and red components) for intensity values up to 127 and thereafter continues to increase but more slowly than that of the red value and more quickly than that of the blue value. This has the effect that, in the region of the crossover between the red and blue lines L1 and L2, the green value predominates and so, when the bitmap is displayed on the display, pixels having the intensity values in the region of the crossover appear grey-green with the actual grey-green colour becoming lighter with increasing intensity value. In this example, the crossover point at which the red value equals the blue value is 192. This value may, however, be adjusted if desired by altering, for example, the constant from 96 to a different value, for example a value of 64 would mean that the crossover point would occur at 128.

As the intensity values further increase, the red and green values become more and more predominate so that display pixels representing intensity values higher than the crossover region appear more and more yellow with increasing intensity value.

The fact that mid-range intensity values appear green to the human eye makes them visually distinguishable from higher or lower intensity values. This should enable a user of the apparatus to determine when he or she has adjusted the illumination to the mid-range for a particular surface to be measured without the user having to check the actual positioning or setting of the user control 400.

FIGS. 20a to 20g and FIGS. 21a to 21g show very diagrammatically grey scale representations of the display pixels obtained for the different light intensity levels to illustrate the effect on the appearance of a display pixel of an image as its intensity value increases from a to g with FIGS. 20a to 20g showing the change where the control apparatus does not carry out the processing described above with reference to FIGS. 17 and 18 and FIGS. 21a to 21g showing the change where the control apparatus 30 does carry out this process and with the pixels represented by FIGS. 20c to 20e and 21c to 21e representing intensity values in the mid-range. As can be seen from FIGS. 20a to 20g, without the processing described above with reference to FIGS. 17 and 18, the mid-range intensity values represented by FIGS. 20c to 20e are relatively difficult to distinguish from the other intensity values because the shading varies gradually from dark blue to light blue (or blue-white). In contrast, in FIG. 21, the mid-range intensity values represented by FIGS. 21c to 21e can easily be distinguished from the other intensity values because they appear grey-green (represented by cross-hatching with the spacing of the cross-hatching increasing with increasing lightness in the grey-green colour) and thus stand out from the generally blue pixels representing the intensity values just outside the mid-range.

As described above with reference to FIG. 18, the control apparatus 30 is arranged to cause intensity values of zero to be represented as red on the display (which may represent missing data) and intensity values of 255 or more, that is saturation values, to be represented as yellow.

If the image contains a large proportion of red pixels this alerts the user to the fact that the measurement data may not be reliable. Representing the saturated illumination level as yellow amongst the otherwise blue image enables the user to see rapidly where the intensity values have saturated so that the user can adjust the light source intensity accordingly. FIG. 22 shows a grey scale representation of the images obtained an image corresponding to that shown in FIG. 13a where the intensity values have saturated for a part of the image and thus the corresponding display pixels are yellow (the yellow pixels being illustrated by shading in FIG. 22).

These features may be used in addition to or without the processing of the intermediate intensity values, that is S52 to 55 may be omitted from FIG. 18 while still providing the user with useful information because, in this case, if the image contains pixels having intensity values of zero, these will show up clearly as red pixels in the otherwise blue and white image clearly indicating to the user that there is data missing and alerting the user to the proportion of missing data.

It will, of course, be appreciated that where gradation enhancement processing is used, other algorithms than that described above may be used. For example, the intensity value for any other pixel on either side of the pixel in question may be used, for example $x_{-1}$, $y_{+1}$ and $x_{+1}$, $y_{-1}$. In addition, the intensity value of the pixel in question may also be taken into consideration. Furthermore, the difference between the intensity values may be multiplied by a factor other than four and the intensity values for two or more pixels on either side of the pixel in question may be used.

In the examples described above where contrast reference or gradient enhancement is used, then scaling factors other than four may be used.

Where a reference frame is used, then this may be pre-stored or could be an average of a number of reference frames.

In the examples described above where the display pixels representing the intensity values are differently coloured dependent on the intensity value, then colours other than those described above may be used. For example, single colours or hues from black to white (grey scale) rather than blue to white (or white-yellow) or from red to white or green to white rather than blue to white may be used with corresponding changes to any specific colours allocated to specific illumination levels or regions, for example, to the zero and saturation intensity values and to the mid-range intensity values so that these are of a different colour or different shades or hues of the same colour. As described above, the control apparatus is configured to cause a range of intensity values in the mid-range to be of different colour (with the different intensity values in the mid-range being represented by different shades of the same colour) because all of the intensity values will of course not be the same. This enables the user easily to identify the illumination level for which the majority or a preponderance of the intensity values lie in the mid-range because, in this case, the overall image will be predominantly of that different colour (shades of green in the present example).

Also, one or more of the image enhancement techniques described above may be used without the other. For example, the focus filter may be omitted and/or one or other or both of the gradation enhancement and contrast enhancement processing may be omitted.

Figure 9:
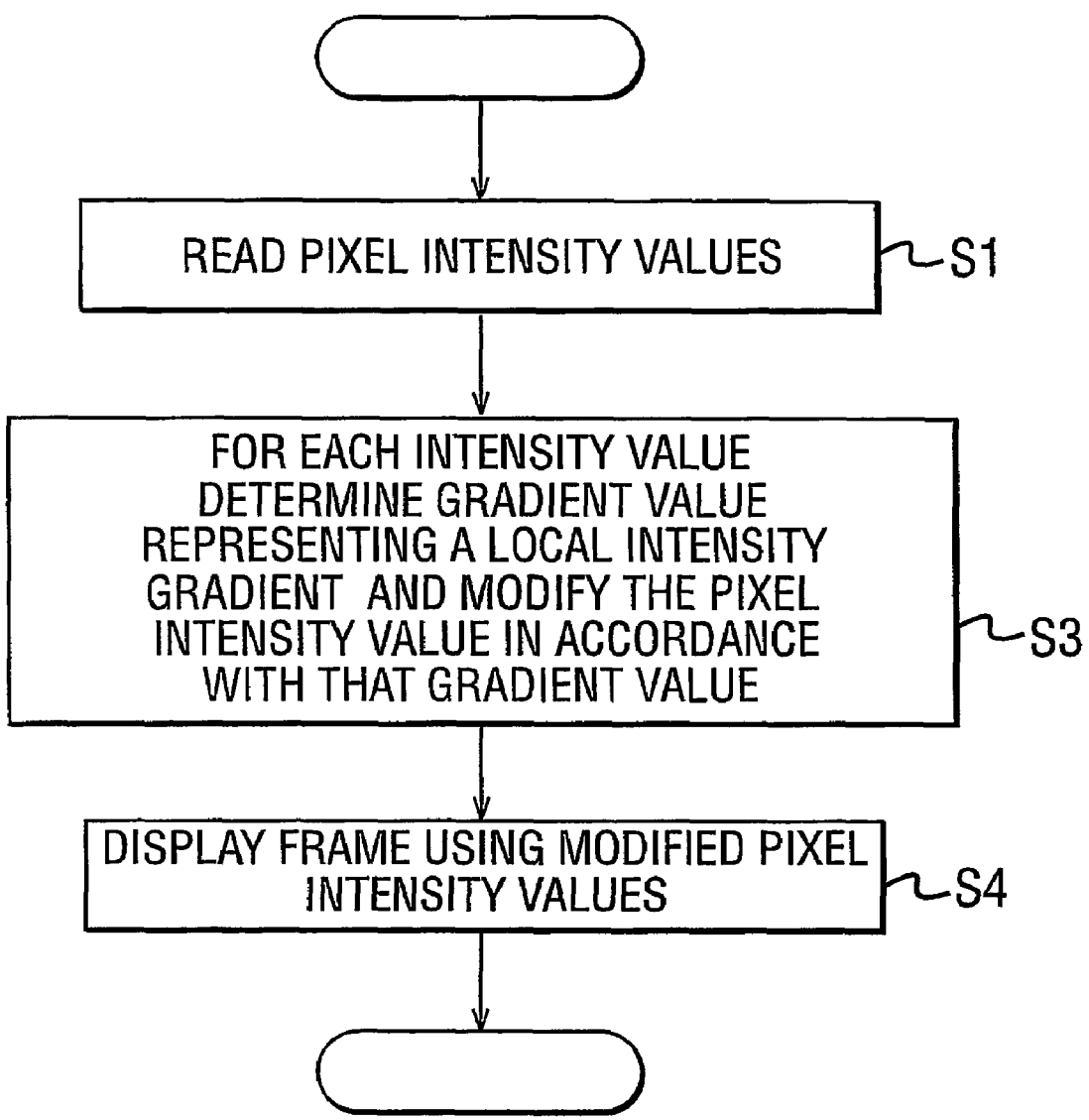
FIG. 9 shows a flow chart for illustrating steps carried out by the control apparatus to provide a gradient enhanced image.

Once the user or operator is satisfied that the interferometer is focussed on the fringes of the interference fringe region, then he or she can set the desired scanning parameters by dragging the pointer 509 shown in FIG. 9 to the required centre, start and finish positions of the measurement path (which does not include any run up and run down which will be determined by the control apparatus) and setting each these by selecting the appropriate one of the buttons 520 to 522. As another possibility the user can enter numerical start, height in micrometers and measurement path range or distance in micrometers in boxes 526 and 527 which will cause the pointer 509, the measurement range bar 511 and end markers shown in FIG. 8 to move to the start, centre and finish position determined by the data entered in boxes 526 and 527.

The operator can also, if desired, check that the Z mover is at its mid position by selecting the mid-range button 512 which will cause the control apparatus 30 to move the Z mover 15 to the mid-point of the Z mover's range and the pointer 509 to move to the corresponding position on the scale 510 if the Z mover is not at its mid position. If the mid-range is outside or to one end of the scan path, the operator can then use the coarse Z positioner 20 to reposition the interferometer system and then repeat the focussing steps described above so as to select a scan path which encompasses the mid-range of the Z mover 15.

Once the operator is satisfied that the set up parameters are correct, then the operator may exit the set up screen and instruct the control apparatus 30 using the keyboard 31a and/or pointing device 31b to commence a measurement operator. When a measurement operation is instructed, the control apparatus 30 causes the Z mover 15 to move the reference mirror 6 along the defined scan path (the measurement path defined by the user plus any run up and run down portions added to the start and end of the measurement path by the control apparatus) in the set up mode and the 2D image sensor detector captures at intervals along the scan path 2D images or frames which are passed to the data processor 32 which processes the intensity values received for each surface pixel or region of the image along the measurement path to determine, for each pixel, the location of the coherence peak shown in FIG. 2. Once, the data processor 32 has determined the coherence peak for each pixel, then the data processor 32 can determine, using the known relative heights at which the images were captured, the relative heights of the different coherence peaks and thus the surface typography of the sample being measured.

The control apparatus 30 may then cause the surface topography to be displayed on the display 36a, for example one or more surface profile cross-sections may be displayed using, for example, the Talymap software supplied by Taylor Hobson Limited, Leicester, England.

As another possibility, or additionally, the display may display a bitmap image in which each surface pixel is represented as a display pixel having a colour or saturation dependent on the corresponding relative height value. In this case, the display may display the bitmap image in a manner analogous to the image displayed during set up so that the majority of the height values are represented by different shades of blue with any out of range values being displayed as yellow and any zero values (which may represent missing data) being displayed in red so that, if the image contains a large proportion of red pixels, this alerts the user to the fact that the measurement data may not be reliable. This height representation bitmap image may be enhanced by using gradient data in a manner similar to that described above with reference to FIG. 9 for the intensity value bitmap with the height values taking the place of the intensity values and corresponding adjustments being made to the constants in equations 1 and 1a. As a further possibility, the gradient enhancement techniques described and claimed in U.S. Pat. Nos. 6,031,928 and 6,345,107 (the whole contents of which are hereby incorporated by reference) may be used. The techniques described and claimed in U.S. Pat. Nos. 6,031,928 and 6,345,107 may also be used in place of that described above with reference to FIG. 9 with the height values being replaced by intensity values.

The operator may then cause the support stage 9 to be moved by the X and/or Y movers to a different area of the surface and may then repeat the measurement operation for that different area to obtain surface typography data for that area.

Although a Windows type display is shown in FIG. 8, it will, of course, be appreciated that other forms of graphical user interface may be used to display the set up functions available to the user or operator. Also, it will be appreciated that the specific arrangement of slider bars, check boxes and selectable buttons shown in FIG. 8 is merely an example and that different combinations of such user interactive elements and/or user interactive elements such as drop down or pop up menus may be used. In addition, the set up display screen shown in FIG. 8 may also include one or more further tabbed panes or screens that include further user controllable functions available to the operator such as a measurement initiation operation screen and calibration screens for enabling calibration of the apparatus.

Where the control apparatus 30 is arranged to colour pixels of a displayed bitmap image in a predetermined manner in accordance with their respective illumination levels, then the display screen 500 may, as shown in phantom lines in FIG. 8, include a colour swatch or bar 700 located adjacent to the image display window in which the colours representing the various illumination levels from zero to saturated are displayed in order so that the operator can match the colours of an image displayed in the window 501 with colours on the colour swatch or bar 700 to facilitate examination of the illumination level. In this case, the colour swatch or bar 700 may carry a pointer 701 defining the mid-range illumination level.

In the above described embodiments, the beam splitter 5 may be a thin film beam splitter, in particular a Herpin filter, or a neutral density partially reflective metal filter, designed to have (over the required bandwidth and the expected angles of incidence) a reflectance of less than 50% so that a smaller proportion of the light is reflected than is transmitted. This may help compensate for the fact that, due to surface roughness or Fresnel reflectance, the reflectance of the sample surface 7 will generally be less than that of the reference mirror 6. Such a partially reflecting filter having a reflectance of about 20% should provide a good compromise in terms of signal-to-noise for surfaces having a reflectance in the range from about 1% to 100%, enabling the surface topography of, for example, of both glass and metal surfaces to be examined.

In the above described embodiments, the Z mover 15 is a piezoelectric mover. It will, however, be appreciated that other forms of movers such as electric motors and the like may be used. In the above described embodiments, the X and Y movers 16 and 17 are electric motors controlled by the controller 21. It is, however, possible, that the X and Y movers 16 and 17 may be manually operable movement devices such as micrometer type ball and screw thread movement devices.

Where the surface to be measure has significant form, then the reference surface 6 may have the same general form; for example where the surface is a surface of an aspheric lens then the reference surface may be an aspheric surface of the same shape and the known shape of the reference may then be subtracted by the control apparatus from the resulting data to facilitate detection and analysis of smaller wavelength surface features such as surface roughness and texture.

The control apparatus 30 may also be configured to determine the form of the reference surface 6 where it is not known or not precisely known. In this case, the user or operator places a calibration surface of known form, such as a precision optical flat, on the sample support stage and acquires a number of images at independent xy positions of the calibration surface. Because the reference surface is effectively subtracted from the sample surface and the sample surface is in this case an optical flat, the residual form and roughness in the acquired data will represent the form and roughness of the reference surface relative to the known optical flat. The control apparatus may be configured to average the acquired data over a number of images to remove or smooth out the roughness of the calibration surface. The control apparatus may be configured to fit a polynomial to the acquired data and to store the resulting polynomial coefficients as reference surface form data for later use to remove or at least reduce the effect on the end results of any form in the reference surface by, for example, subtracting the reference surface form data from data acquired from future sample surfaces. As another possibility, the control apparatus may be configured to store all the acquired data as reference surface form and roughness data so that both the reference surface form and roughness can be subtracted from data acquired for future sample surfaces.

In the above described examples, the end markers 511*a* and 511*b* simply indicate the beginning and end of the measurement part of the scan path. These may however be configured to be movable by the user to provide the user with a further way of changing the measurement path start and end points.

In the above described example, a contrast reference may be used to enhance an image acquired during the set up procedure. Such a contrast reference image may also be used as a template to enable location of repeating patterns of features on the surface being measured as may arise, for example, in the case of a semiconductor wafer carrying a number of semiconductor devices each having the same surface topography pattern. In this case, the contrast reference is acquired when the surface features such as the grid shown in FIGS. 12*a* to 12*d* (but not any fringes) are in focus so that reference includes the surface features. The contrast reference button can then be selected when searching the surface for the repeating pattern. As the contrast reference frame image data is subtracted from an acquired frame of image data before display, the pattern will be highlighted or emphasized in the displayed image when the pattern is mis-aligned with the pattern in the contrast reference frame, so assisting the operator in locating the pattern.

Although in the above described embodiments, the data processing and control apparatus 3 is shown located close to the interferometer system 2, it will, of course, be appreciated that the data processing and control apparatus 3 may be located remotely from the interferometer system. Also, the data processor 32 itself, together with or separate from the user interface may be located remotely from at least one of the data processing and control apparatus 3 and the interferometer system. In the examples described above, the user interface forms part of the surface profiling apparatus. It may, however, be provided in a separate computing apparatus that communicates either locally or remotely. Remote communication may be achieved, for example via a wireless infrared or radio link or a via a network such as an Intranet or the Internet, using a web browser-like interface.

The Z axis datum may be replaced by a gantry or microscope-style support.

The techniques described above may also be applied to the surface profiling apparatus described and claimed in UK Patent Application No. 0206023.4 (Publication No. 2385417), the whole contents of which are hereby incorporated by reference.

The invention claimed is:

1. Surface profiling apparatus for obtaining surface profile data for a sample surface, the apparatus comprising:
    a light director operable to direct light from a light source along a sample path towards the sample surface and along a reference path towards a reference surface such that light reflected by the sample surface and light reflected by the reference surface interfere;
    a mover to move at least one of the sample surface along the sample path or the reference surface along the reference path to effect relative movement between the sample surface and the reference surface along a measurement path;
    a sensor to sense light intensity resulting from interference between light reflected from the reference surface and regions of the sample surface, the sensor includes a plurality of pixels, each pixel arranged in the sensor to provide a light intensity data value representing the light intensity associated with a corresponding one of the regions of the sample surface, the sensor adapted to sense sets of light intensity data, each set of light intensity data being one frame of light intensity data sensed at one interval along the measurement path and comprising a plurality of the light intensity data values, such that each light intensity data value in the set of light intensity data represents the light intensity sensed by at least one corresponding pixel of the sensor;
    a data processor to process the sets of light intensity data to determine from the light intensity data values associated with each sensed region a position along the measurement path at which a predetermined feature occurs in light intensity data for that sensed region; and
    a surface profiler to determine from the positions at which the predetermined feature occurs in the light intensity data for the different sensed regions the relative surface heights of the different sensed regions to provide a surface profile,
    the apparatus further comprising an image enhancer to enhance image data representing one set of light intensity data to be displayed on a display to facilitate the detection by a user of the interference fringes, the image enhancer comprising at least one of:
        a gradient determiner to determine from a set of light intensity data light intensity gradient data and a modifier to modify the image data to be displayed in accordance with the determined gradient data; or
        a contrast determiner to determine contrast difference data by comparing the set of light intensity data with a reference set of light intensity data and a modifier to modify the image data to be displayed in accordance with the determined contrast difference data.

2. Apparatus according to claim 1, wherein the image enhancer comprises each of the gradient determiner to determine the light intensity gradient data, the contrast determiner to determine the contrast difference data and the modifier to modify the image data to be displayed in accordance with the determined gradient data and the contrast difference data.

3. Apparatus according to claim 1, wherein the gradient determiner determines local gradient data associated with a light intensity data value by comparing the light intensity data values associated with regions on either side of the region that provided the light intensity data value.

4. Apparatus according to claim 2, wherein the regions are arranged in a rectangular array and the gradient determiner determines local gradient data associated with a light intensity data value by comparing the light intensity data values associated with regions at respective ends of a diagonal containing the region associated with the light intensity data value.

5. Apparatus according to claim 1, wherein the regions are arranged in a rectangular xy array and the gradient determiner determines local gradient data associated with a light intensity data value associated with a region at coordinates x,y in the array by comparing the light intensity data values associated with regions at coordinates x+1, y+1 and x−1, y−1.

6. Apparatus according to claim 1, wherein the regions are arranged n a rectangular xy array and the modifier determines a modified intensity data value $I_M$ for a light intensity data value I associated with the region at coordinates x,y in accordance with:

$$I_M = 64 + \tfrac{1}{2} + (I_{-1} - I_{+1}) \times 4$$

where $I_{+1}$ and $I_{-1}$ are the intensity data values associated with the regions at coordinates x+1, y+1 and x−1, y−1, respectively.

7. Apparatus according to claim 1, wherein the contrast determiner determines the contrast difference data by subtracting from the intensity data value I of the set the corresponding intensity data value $I_R$ of the reference set.

8. Apparatus according to claim 1, wherein the modifier determines a modified intensity data value $I_M$ for a light intensity data value I in accordance with:

$$I_M = 64 + \tfrac{1}{2} + (I - I_R) \times 4$$

where $I_R$ is the corresponding intensity data value of the reference set.

9. Apparatus according to claim 2, wherein the regions are arranged in a rectangular xy array and the modifier is operable to determine a modified intensity data value $I_M$ for a light intensity data value I associated with the region at coordinates x,y in accordance with:

$$I_M = 64 + \tfrac{1}{2} + (I - I_R) \times 4 + (I_{-1} - I_{+1}) \times 4$$

wherein $I_{+1}$ and $I_{-1}$ are the intensity data values associated with the regions at coordinates x+1, y+1 and x−1, y−1, respectively, and $I_R$ is the corresponding intensity data value of the reference set.

10. Apparatus according to claim 1, further comprising a user operable device that enables a user to select the reference set.

11. Apparatus according to claim 1, wherein the image enhancer comprises a user-selectable filter device operable to restrict the wavelength range of the light source.

12. Apparatus according to claim 11, wherein the user-selectable filter device comprises a filter assembly mounted in a light path from the light source and having a housing having a filter carrier mounted in the housing so as to be rotatable about an axis, the filter carrier having a plurality of filters spaced around the axis and having a peripheral surface provided with land portions each associated with a corresponding filter and each distinguishable by a user for allowing a user to rotate the filter carrier to bring a selected filter to a predetermined position.

13. Apparatus according to claim 1, wherein the image enhancer cause the majority of the light intensity data values to appear to be represented by a single colour with the apparent lightness of the colour varying with the light intensity data value such that the lightness either increases or decreases with increase in the light intensity data value and to cause at least one of a light intensity data value representing a highest light intensity, a light intensity data value representing a lowest light intensity and light intensity data values representing midrange light intensities to be displayed so as to appear to be of a different colour to enable the user to identify the light intensity level represented by that light intensity data value.

14. Apparatus according to claim 13, further comprising a user-operable control that enables a user to control a light output intensity of the light source.

15. Apparatus according to claim 13, wherein the image enhancer cause at least tow of the light intensity data value representing the highest light intensity, the light intensity data value representing the lowest zero light intensity and the light intensity data values representing midrange light intensities to be displayed so as to appear to be of different colours from the colour to enable the user to identify the light intensity level represented by that light intensity data value.

16. Apparatus according to claim 1, further comprising a surface form extractor operable to extract a form of the reference surface from the sets of light intensity data.

17. A data processing method comprising:
   directing light along a sample path towards the sample surface and along a reference path towards a reference surface such that light reflected by the sample surface and light reflected by the reference surface interfere;
   moving at least one of the sample surface along the sample path and the reference surface along the reference path to effect relative movement between the sample surface and the reference surface along a measurement path;
   sensing light intensity resulting from interference between light reflected from the reference surface and regions of the sample surface, by sensing with a plurality of pixels, each pixel arranged to provide a light intensity data value representing the light intensity associated with a corresponding one of the regions of the sample surface, so as to sense sets of light intensity data, each set of light intensity data being one frame of light intensity data sensed at one interval along the measurement path and comprising a plurality of the light intensity data values, such that each light intensity data value in the set of light intensity data represents the light intensity sensed by at least one corresponding pixel;
   processing the sets of light intensity data to determine from the light intensity data values associated with each sensed region a position along the measurement path at which a predetermined feature occurs in the light intensity data for that sensed region; and
   enhancing image data to be displayed on a display to facilitate the detection by a user of the interference fringes in image data in response to user input, enhancing image data comprising at least one of:
      determining a gradient from a set of light intensity data light intensity gradient data and modifying the image data to be displayed in accordance with the determined gradient data; or
      determining contrast difference data by comparing the set of light intensity data with a reference set of light intensity data and modifying the image data to be displayed in accordance with the determined contrast difference data.

18. A method according to claim 17, further comprising determining from the positions at which the predetermined feature occurs in the light intensity data for the different sensed regions the relative surface heights of the different sensed regions to provide a surface profile.

19. A storage medium carrying processor-implementable instructions for causing processor means to carry out a method in accordance with claim 17.

20. Surface profiling apparatus for obtaining surface profile data for a sample surface, the apparatus comprising:

light directing means for directing light from a light source providing means along a sample path towards the sample surface and along a reference path towards a reference surface such that light reflected by the sample surface and light reflected by the reference surface interfere;

moving means for moving at least one of the sample surface along the sample path or the reference surface along the reference path to effect relative movement between the sample surface and the reference surface along a measurement path;

sensing means for sensing light intensity resulting from interference between light reflected from the reference surface and regions of the sample surface, the sensing means including a plurality of pixels, each pixel arranged in the sensing means to provide a light intensity data value representing the light intensity associated with a corresponding one of the regions of the sample surface, the sensing means being adapted to sense sets of light intensity data, each set of light intensity data being one frame of light intensity data sensed at one interval along the measurement path and comprising a plurality of the light intensity data values, such that each light intensity data value in the set of light intensity data represents the light intensity sensed by at least one corresponding pixel of the sensing means;

data processing means for processing the sets of light intensity data to determine from the light intensity data values associated with each sensed region a position along the measurement path at which a predetermined feature occurs in the light intensity data for that sensed region; and surface profile determining means for determining from the positions at which the predetermined feature occurs in the light intensity data for the different sensed regions the relative surface heights of the different sensed regions to provide a surface profile, the apparatus further comprising image enhancing means for enhancing image data representing one set of light intensity data to be displayed on a display to facilitate the detection by a user of the interference fringes, the image enhancing means comprising at least one of:

gradient determining means for determining, from a set of light intensity data light intensity, gradient data and modifying means for modifying the image data to be displayed in accordance with the determined gradient data; or contrast determining means for determining contrast difference data by comparing the set of light intensity data with a reference set of light intensity data and modifying means for modifying the image data to be displayed in accordance with the determined contrast difference data.

21. Surface profiling apparatus for obtaining surface topography data for a surface of a sample, the apparatus comprising:

a sample support;

a light director to direct light along a sample path towards the sample surface and along a reference path towards a reference surface such that light reflected by corresponding regions of the sample surface and the reference surface interfere;

a mover to effect relative movement along a measurement path between the sample surface and the reference surface;

a sensor to sense, for each of a number of regions of the sample surface, light representing the interference fringes produced by that sample surface region during said relative movement;

a controller to carry out a measurement operation by causing said mover to effect said relative movement while said sensor senses light intensity at intervals to provide, for each of the number of regions, a set of intensity values representing interference fringes produced by that region during said relative movement;

a data processor to process the sets of light intensity data to determine from the light intensity data values associated with each sensed region a position along the measurement path at which a predetermined feature occurs in the light intensity data for that sensed region; and a surface topography determiner to determine, from the positions at which the predetermined feature occurs in the light intensity data for the different sensed regions, the relative surface heights of the different sensed regions to provide surface topography data, the apparatus further comprising:

a reference calibrator to calibrate the apparatus to compensate for surface features of the reference surface, the reference calibrator comprising:

a user operable calibration initiator operable to initiate a calibration;

a calibration controller to cause, in response to operation of the calibration measurement initiator, operation of the controller, data processor and surface topography determiner to carry out a number of calibration measurement operations to obtain in each calibration measurement operation calibration surface topography data for the calibration sample;

a surface topography data processor to process the calibration surface topography data obtained in the calibration measurement operations; and a mean surface calculator to calculate mean surface topography data using the processed calibration surface topography data to obtain reference surface features data to enable the reference surface features to be taken into account for surface topography data obtained in a subsequent measurement operation.

* * * * *

UNITED STATES PATENT AND TRADEMARK OFFICE
CERTIFICATE OF CORRECTION

| | | |
|---|---|---|
| PATENT NO. | : 7,518,733 B2 | Page 1 of 1 |
| APPLICATION NO. | : 10/536821 | |
| DATED | : April 14, 2009 | |
| INVENTOR(S) | : Andrew D. Bankhead, Ian Lee-Bennett and Ivor McDonnell | |

It is certified that error appears in the above-identified patent and that said Letters Patent is hereby corrected as shown below:

Column 23, line 15, "n" should be --in--.

Column 23, lines 36-37, "is operable to determine" should be --determines--.

Column 24, line 11, "tow" should be --two--.

Column 24, line 13, "and" should be --or--.

Column 24, line 19, "operable" should be deleted.

Column 24, line 28, "and" should be --or--.

Signed and Sealed this

Second Day of February, 2010

David J. Kappos
*Director of the United States Patent and Trademark Office*